United States Patent
Yoshida et al.

(10) Patent No.: US 11,657,477 B2
(45) Date of Patent: May 23, 2023

(54) IMAGE PROCESSING DEVICE, IMAGE PROCESSING SYSTEM, IMAGING DEVICE, IMAGE PROCESSING METHOD, AND RECORDING MEDIUM STORING PROGRAM CODE

(71) Applicant: Ricoh Company, Ltd., Tokyo (JP)

(72) Inventors: Kazuhiro Yoshida, Kanagawa (JP); Takamichi Katoh, Tokyo (JP); Takashi Tada, Saitama (JP); Hiroyuki Kawamoto, Kanagawa (JP); Makoto Usami, Tokyo (JP); Kenichi Ono, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 205 days.

(21) Appl. No.: 17/158,113

(22) Filed: Jan. 26, 2021

(65) Prior Publication Data
US 2021/0233209 A1  Jul. 29, 2021

(30) Foreign Application Priority Data
Jan. 29, 2020  (JP) .............................. JP2020-012873

(51) Int. Cl.
*G06T 3/40* (2006.01)
*G06T 3/00* (2006.01)
(Continued)

(52) U.S. Cl.
CPC .......... *G06T 3/4038* (2013.01); *G06T 3/0062* (2013.01); *G06T 5/50* (2013.01); *H04N 23/698* (2023.01)

(58) Field of Classification Search
CPC ....... G06T 3/4038; G06T 3/0062; G06T 5/50; G06T 2200/32; G06T 2207/20021; G06T 7/32; H04N 5/23238
See application file for complete search history.

(56) References Cited

U.S. PATENT DOCUMENTS

| 5,231,516 A | 7/1993 | Kamon et al. |
| 5,481,371 A | 1/1996 | Kamon et al. |

(Continued)

FOREIGN PATENT DOCUMENTS

| JP | 2006-135386 | 5/2006 |
| JP | 2016-040670 | 3/2016 |

OTHER PUBLICATIONS

U.S. Appl. No. 09/665,054, filed Sep. 19, 2000, Yuji Takahashi, et al.

(Continued)

*Primary Examiner* — Chan S Park
*Assistant Examiner* — Daniel C Chang
(74) *Attorney, Agent, or Firm* — Xsensus LLP

(57) ABSTRACT

An image processing device, an image processing system, an imaging device, an image processing method, and a recording medium storing program code. The image processing device includes a receiver configured to receive a first image and a second image, a memory configured to store a joining position at each one of a plurality of portions between the first image and the second image received by the receiver, and circuitry configured to evaluate, for each of the plurality of portions, validity of the joining position in a past stored in the memory, and generate a composite image based on the first image and the second image received by the receiver and the joining position in the past stored in the memory on a site where the validity meets a criterion. The method includes reading a past joining position at each one of a plurality of portions between a pair of images.

13 Claims, 33 Drawing Sheets

(51) Int. Cl.
*G06T 5/50* (2006.01)
*H04N 23/698* (2023.01)

(56) References Cited

U.S. PATENT DOCUMENTS

| | | | |
|---|---|---|---|
| 5,892,852 | A | 4/1999 | Namizuka et al. |
| 6,057,940 | A | 5/2000 | Kawamoto |
| 6,151,457 | A | 11/2000 | Kawamoto |
| 6,243,500 | B1 | 6/2001 | Kawamoto |
| 6,268,929 | B1 | 7/2001 | Ono |
| 6,486,971 | B1 | 11/2002 | Kawamoto |
| 6,763,473 | B1 | 7/2004 | Oteki et al. |
| 6,862,101 | B1 | 3/2005 | Miyazaki et al. |
| 6,930,793 | B1 | 8/2005 | Namizuka et al. |
| 6,963,420 | B1 | 11/2005 | Kawamoto et al. |
| 6,967,744 | B1 | 11/2005 | Kawamoto |
| 7,072,058 | B1 | 7/2006 | Miyazaki et al. |
| 7,161,714 | B1 | 1/2007 | Namizuka et al. |
| 2001/0012113 | A1 | 8/2001 | Yoshizawa et al. |
| 2001/0012127 | A1 | 8/2001 | Fukuda et al. |
| 2001/0015821 | A1 | 8/2001 | Namizuka et al. |
| 2001/0019429 | A1 | 9/2001 | Oteki et al. |
| 2001/0021278 | A1 | 9/2001 | Fukuda et al. |
| 2001/0050778 | A1 | 12/2001 | Fukuda et al. |
| 2001/0054126 | A1 | 12/2001 | Fukuda et al. |
| 2002/0012131 | A1 | 1/2002 | Oteki et al. |
| 2002/0018244 | A1 | 2/2002 | Namizuka et al. |
| 2002/0021351 | A1 | 2/2002 | Shinohara et al. |
| 2002/0027670 | A1 | 3/2002 | Takahashi et al. |
| 2002/0054374 | A1 | 5/2002 | Inoue et al. |
| 2002/0135789 | A1 | 9/2002 | Ono |
| 2002/0191694 | A1 | 12/2002 | Ohyama et al. |
| 2002/0196470 | A1 | 12/2002 | Kawamoto et al. |
| 2003/0122825 | A1 | 7/2003 | Kawamoto |
| 2003/0184808 | A1 | 10/2003 | Fukuda et al. |
| 2004/0061802 | A1 | 4/2004 | Yoshida |
| 2004/0114172 | A1 | 6/2004 | Ohyama et al. |
| 2004/0125410 | A1 | 7/2004 | Shirata et al. |
| 2004/0131263 | A1 | 7/2004 | Kawamoto et al. |
| 2004/0156076 | A1 | 8/2004 | Togami et al. |
| 2004/0160508 | A1 | 8/2004 | Ono |
| 2004/0188717 | A1 | 9/2004 | Ono |
| 2004/0255175 | A1 | 12/2004 | Oteki et al. |
| 2004/0263884 | A1 | 12/2004 | Arai et al. |
| 2004/0263890 | A1 | 12/2004 | Kawamoto et al. |
| 2005/0024666 | A1 | 2/2005 | Ohyama et al. |
| 2005/0046881 | A1 | 3/2005 | Tone et al. |
| 2005/0157945 | A1 | 7/2005 | Namizuka et al. |
| 2005/0179954 | A1 | 8/2005 | Arai et al. |
| 2005/0213120 | A1 | 9/2005 | Ohkawa et al. |
| 2005/0219594 | A1 | 10/2005 | Miyamoto et al. |
| 2005/0237570 | A1 | 10/2005 | Namizuka et al. |
| 2005/0243375 | A1 | 11/2005 | Ohyama et al. |
| 2005/0259279 | A1 | 11/2005 | Ohyama et al. |
| 2005/0280857 | A1 | 12/2005 | Sugiyama et al. |
| 2006/0028683 | A1 | 2/2006 | Fukuda et al. |
| 2006/0028684 | A1 | 2/2006 | Namizuka et al. |
| 2006/0221415 | A1 | 10/2006 | Kawamoto |
| 2007/0053009 | A1 | 3/2007 | Ito et al. |
| 2007/0070405 | A1 | 3/2007 | Murakata et al. |
| 2007/0070438 | A1 | 3/2007 | Yoshida et al. |
| 2007/0086068 | A1 | 4/2007 | Ohkawa et al. |
| 2007/0103717 | A1 | 5/2007 | Ono |
| 2007/0127094 | A1 | 6/2007 | Kawamoto |
| 2007/0300093 | A1 | 12/2007 | Oteki et al. |
| 2008/0002747 | A1 | 1/2008 | Ono |
| 2008/0037036 | A1 | 2/2008 | Togami et al. |
| 2008/0043291 | A1 | 2/2008 | Togami et al. |
| 2008/0068671 | A1 | 3/2008 | Yoshida et al. |
| 2008/0074535 | A1 | 3/2008 | Ohsuga et al. |
| 2008/0094647 | A1 | 4/2008 | Takahashi et al. |
| 2010/0296701 | A1* | 11/2010 | Hu .................. G06V 40/20 382/103 |
| 2011/0102668 | A1 | 5/2011 | Kaga et al. |
| 2011/0109790 | A1 | 5/2011 | Shinohara et al. |
| 2011/0128436 | A1 | 6/2011 | Ohsuga et al. |
| 2011/0141526 | A1 | 6/2011 | Kawamoto |
| 2011/0216237 | A1 | 9/2011 | Shinohara et al. |
| 2011/0222085 | A1 | 9/2011 | Takesue et al. |
| 2011/0298970 | A1 | 12/2011 | Shinohara et al. |
| 2012/0019844 | A1 | 1/2012 | Tonami et al. |
| 2012/0147397 | A1 | 6/2012 | Kawamoto |
| 2012/0154665 | A1 | 6/2012 | Kaga et al. |
| 2012/0327467 | A1 | 12/2012 | Sugiyama et al. |
| 2013/0076936 | A1 | 3/2013 | Yoshida |
| 2013/0136315 | A1 | 5/2013 | Kawamoto |
| 2013/0250319 | A1 | 9/2013 | Kaneko et al. |
| 2013/0250369 | A1 | 9/2013 | Kitai et al. |
| 2013/0250370 | A1 | 9/2013 | Kojima et al. |
| 2013/0250377 | A1 | 9/2013 | Kitai et al. |
| 2013/0250378 | A1 | 9/2013 | Kitai et al. |
| 2014/0313538 | A1 | 10/2014 | Kitai et al. |
| 2014/0320872 | A1 | 10/2014 | Miyamoto et al. |
| 2014/0347526 | A1 | 11/2014 | Hara et al. |
| 2015/0215595 | A1 | 7/2015 | Yoshida |
| 2016/0048973 | A1 | 2/2016 | Takenaka |
| 2016/0050369 | A1 | 2/2016 | Takenaka et al. |
| 2016/0212336 | A1 | 7/2016 | Takenaka et al. |
| 2017/0094169 | A1 | 3/2017 | Yoshikawa et al. |
| 2018/0075635 | A1* | 3/2018 | Choi .................. H04N 13/156 |
| 2018/0182065 | A1 | 6/2018 | Yoshida et al. |
| 2018/0184001 | A1 | 6/2018 | Yoshida et al. |
| 2018/0332221 | A1* | 11/2018 | Takenaka ............. G06V 10/751 |
| 2019/0340737 | A1 | 11/2019 | Kawaguchi et al. |
| 2019/0347766 | A1 | 11/2019 | Kawaguchi et al. |
| 2019/0347775 | A1 | 11/2019 | Suitoh et al. |
| 2020/0007763 | A1 | 1/2020 | Takenaka et al. |
| 2020/0043134 | A1* | 2/2020 | Martin .................. G06T 7/12 |
| 2020/0236277 | A1 | 7/2020 | Odamaki et al. |
| 2020/0252529 | A1 | 8/2020 | Tada |
| 2020/0304751 | A1 | 9/2020 | Katoh et al. |

OTHER PUBLICATIONS

U.S. Appl. No. 09/705,836, filed Nov. 6, 2000, Sugitaka Oteki, et al.

* cited by examiner

| COORDINATE VALUES AFTER CONVERSION | | COORDINATE VALUES BEFORE CONVERSION | |
|---|---|---|---|
| $\theta$ (pix) | $\phi$ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

SEARCH POSITION (kx, ky)

FIG. 13

| COORDINATE VALUES AFTER CONVERSION | | JOINING POSITION (AMOUNT OF SHIFTING) | |
|---|---|---|---|
| $\theta$ (pix) | $\phi$ (pix) | $\Delta \theta$ (pix) | $\Delta \phi$ (pix) |
| 0 | 0 | | |
| 1 | 0 | | |
| ⋮ | ⋮ | ⋮ | ⋮ |
| 3598 | 1799 | | |
| 3599 | 1799 | | |

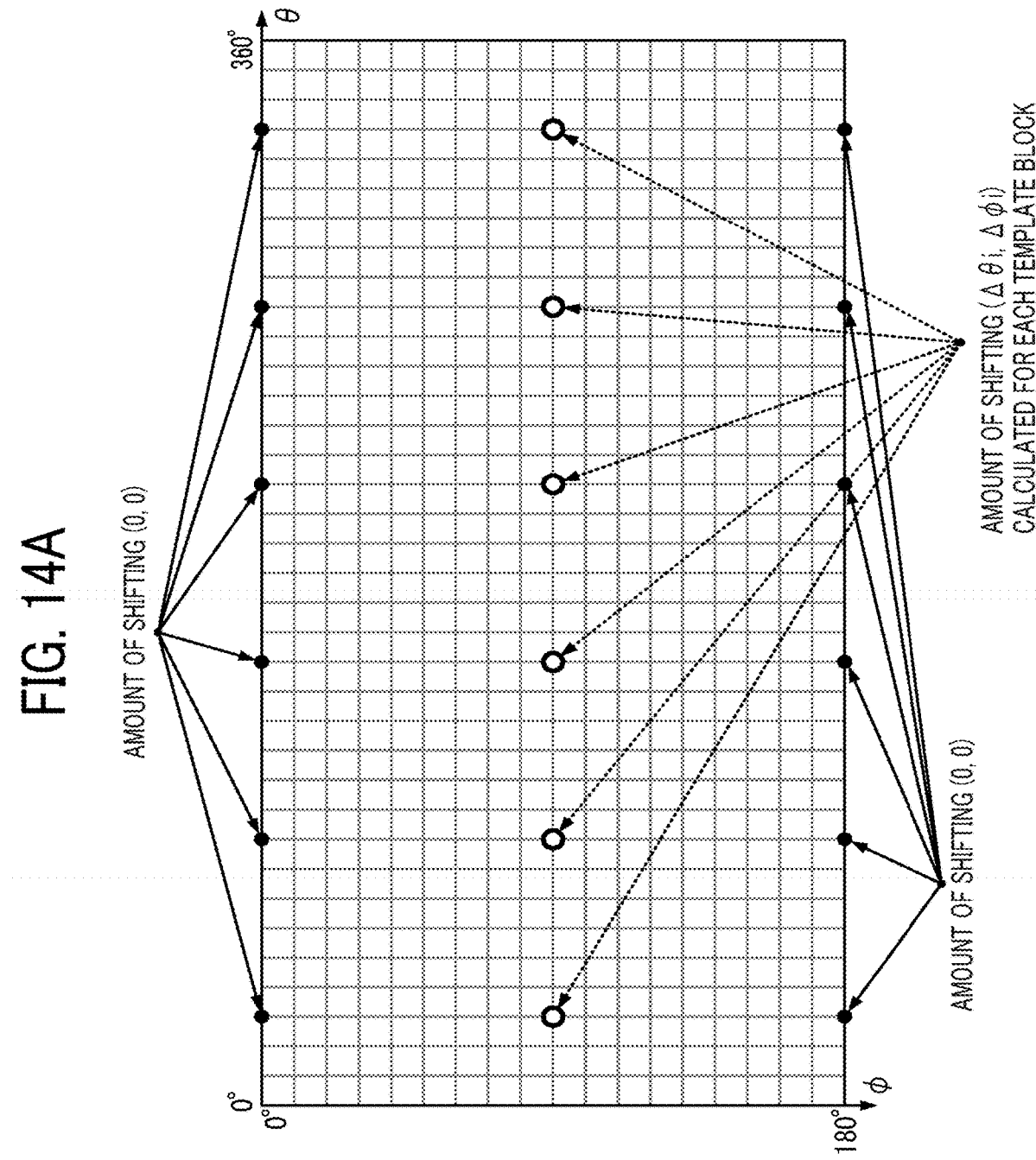

FIG. 21A

| BLOCK NUMBER | x | y |
|---|---|---|
| 1 | x1 | y1 |
| 2 | x2 | y2 |
| 3 | x3 | y3 |
| 4 | x4 | y4 |
| 5 | x5 | y5 |
| 6 | x6 | y6 |
| ⋮ | ⋮ | ⋮ |

FIG. 21B

| BLOCK NUMBER | EVALUATION VALUE | RESULT OF EVALUATION |
|---|---|---|
| 1 | v1 | f1 |
| 2 | v2 | f2 |
| 3 | v3 | f3 |
| 4 | v4 | f4 |
| 5 | v5 | f5 |
| 6 | v6 | f6 |
| ⋮ | ⋮ | ⋮ |

FIG. 25A

| BLOCK NUMBER | BASIC | | PREVIOUS | |
|---|---|---|---|---|
| | x | y | x | y |
| 1 | xa1 | ya1 | xb1 | yb1 |
| 2 | xa2 | ya2 | xb2 | yb2 |
| 3 | xa3 | ya3 | xb3 | yb3 |
| 4 | xa4 | ya4 | xb4 | yb4 |
| 5 | xa5 | ya5 | xb5 | yb5 |
| 6 | xa6 | ya6 | xb6 | yb6 |
| ⋮ | ⋮ | ⋮ | ⋮ | ⋮ |

FIG. 25B

| BLOCK NUMBER | FIRST EVALUATION VALUE | SECOND EVALUATION VALUE | RESULT OF EVALUATION |
|---|---|---|---|
| 1 | v11 | v21 | f1 |
| 2 | v12 | v22 | f2 |
| 3 | v13 | v23 | f3 |
| 4 | v14 | v24 | f4 |
| 5 | v15 | v25 | f5 |
| 6 | v16 | v26 | f6 |
| ⋮ | ⋮ | ⋮ | ⋮ |

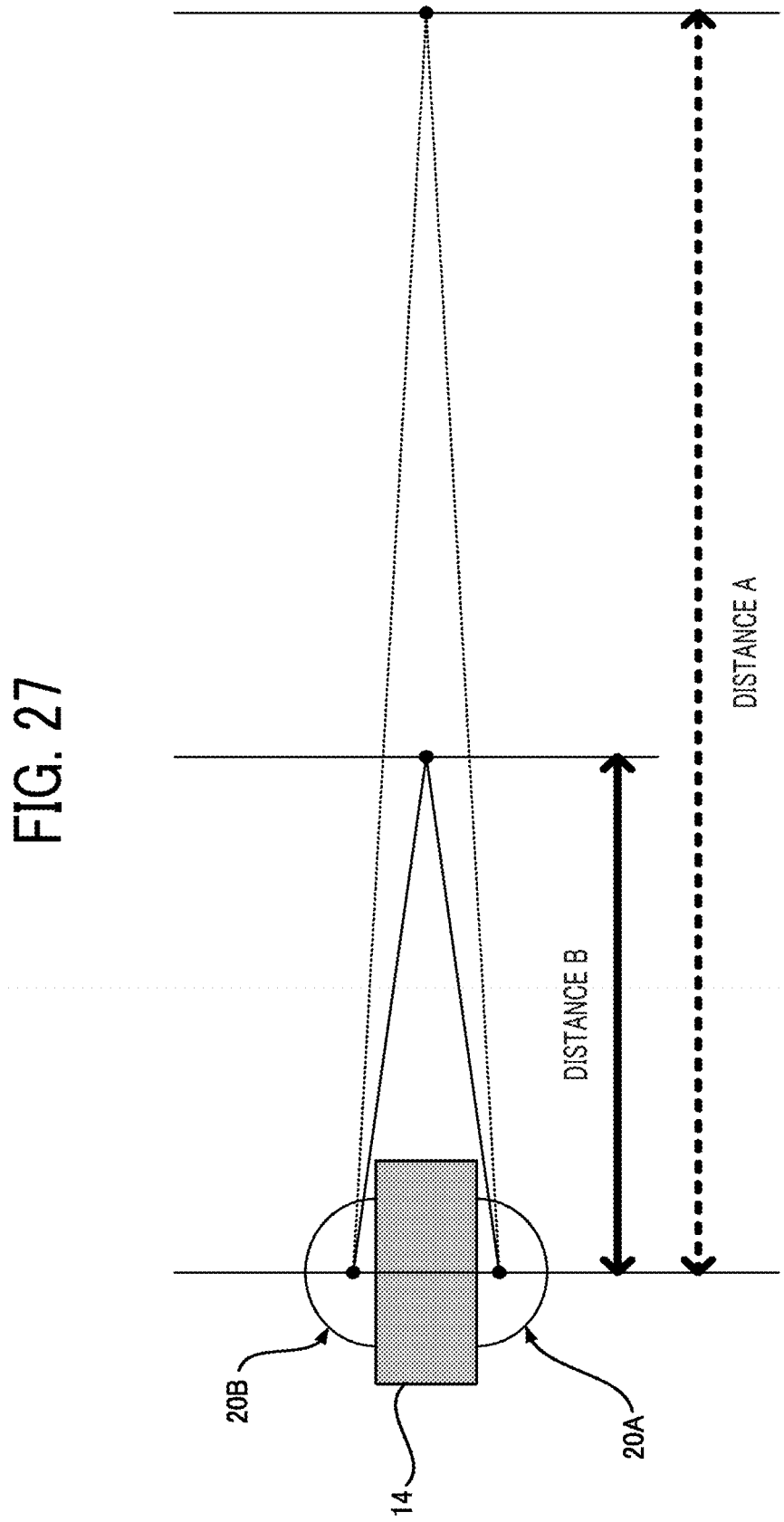

IMAGE PROCESSING DEVICE, IMAGE PROCESSING SYSTEM, IMAGING DEVICE, IMAGE PROCESSING METHOD, AND RECORDING MEDIUM STORING PROGRAM CODE

CROSS-REFERENCE TO RELATED APPLICATION

This patent application is based on and claims priority pursuant to 35 U.S.C. § 119(a) to Japanese Patent Application No. 2020-012873, filed on Jan. 29, 2020, in the Japan Patent Office, the entire disclosure of which is hereby incorporated by reference herein.

BACKGROUND

Technical Field

Embodiments of the present disclosure relate to an image processing device, an image processing system, an imaging device, an image processing method, and a recording medium storing program code.

Background Art

As known in the art, imaging devices that capture an omnidirectional image or a spherical image use a plurality of wide-angle lenses or a plurality of fish-eye lenses. Such imaging devices perform distortion correction and projective transformation on the captured multiple images, and join or combine a plurality of partial-view images that are captured by the multiple wide-angle lenses or fish-eye lenses to obtain one omnidirectional image or spherical image. In so doing, images are joined or combined together upon detecting a position of an overlapping area where a plurality of partial-view images overlap each other and a captured object overlaps with the same object, using, for example, the pattern matching method.

SUMMARY

Embodiments of the present disclosure described herein provide an image processing device, an image processing system, an imaging device, an image processing method, and a recording medium storing program code. The image processing device includes a receiver configured to receive a first image and a second image, a memory configured to store a joining position at each one of a plurality of portions between the first image and the second image received by the receiver, and circuitry configured to evaluate, for each of the plurality of portions, validity of the joining position in a past stored in the memory, and generate a composite image based on the first image and the second image received by the receiver and the joining position in the past stored in the memory on a site where the validity meets a criterion. The method includes reading a past joining position at each one of a plurality of portions between a pair of images, receiving a first image and a second image, evaluating validity of the past joining position read in the reading for each of the plurality of portions; and generating a composite image based on the first image and the second image and the past joining position read for a site where the validity meets a criterion.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 9A and FIG. 9B are diagrams illustrating the conversion data that a position-detecting distortion correction unit and an image-combining distortion correction unit refer to, according to embodiments of the present disclosure.

FIG. 13 is a diagram illustrating an example data structure of a joining-position table generated to correct a position-detecting conversion table, where the joining-position table includes the joining position of each one of the pixels of an image, according to embodiments of the present disclosure.

FIG. 14A and FIG. 14B are diagrams each illustrating how a joining-position table used for correcting a position-detecting conversion table is generated, according to embodiments of the present disclosure.

FIG. 21A and FIG. 21B are diagrams each illustrating an example data structure of the joining-position data stored in a joining-position data storage unit, according to embodiments of the present disclosure.

FIG. 25A and FIG. 25B is a diagram illustrating an example data structure of the joining-position data stored in a joining-position data storage unit, according to a modification of the above embodiments of the present disclosure.

FIG. 27 is a diagram illustrating how a joining position varies depending on the distance to an object, according to embodiments of the present disclosure.

Figure 1A:
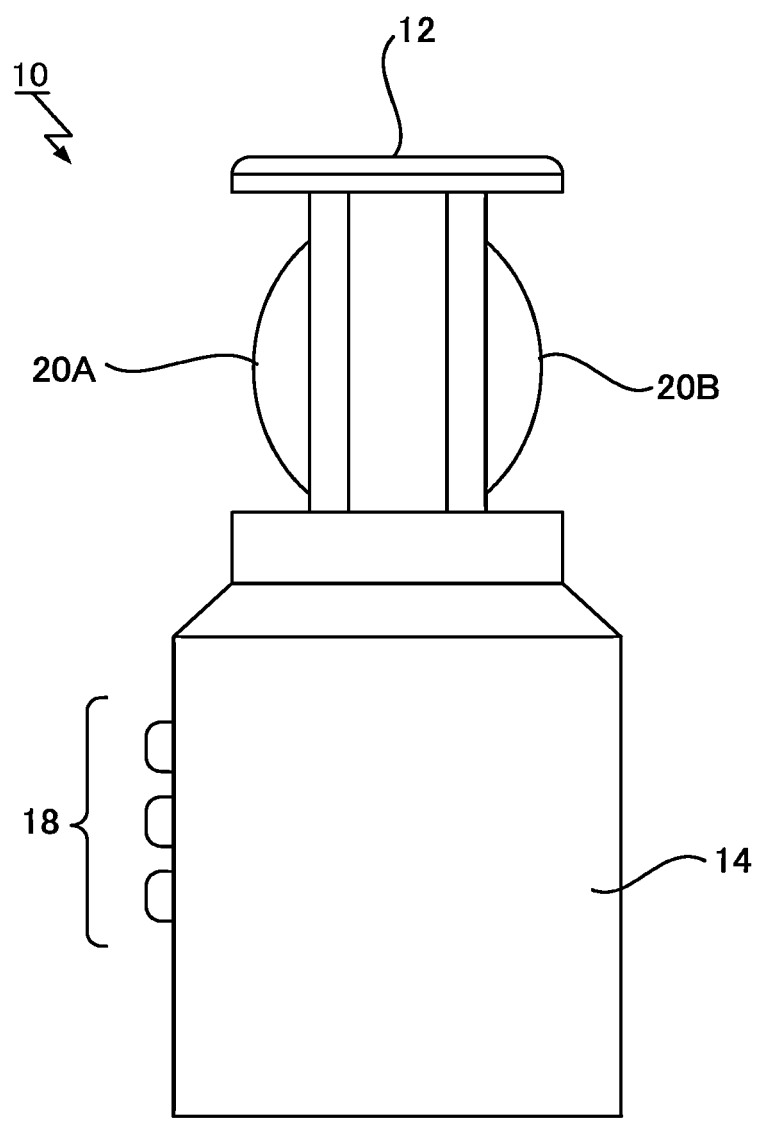
FIG. 1A, FIG. 1B, and FIG. 1C are diagrams each illustrating an external view of an omnidirectional imaging device, according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some embodiments of the present disclosure are described below, but no limitation is indicated thereby and various applications and modifications may be made without departing from the scope of the disclosure. In the embodiments described below, an omnidirectional imaging device 10 is described as an example of an image processing device, an image processing system, and an imaging device that includes the image processing device. The omnidirectional imaging device 10 includes an imaging body having an optical system provided with a pair of fish-eye lenses, and has an image processing function to perform distortion correction and projective transformation on the pair of partial-view images that are captured by the pair of fish-eye lenses, and join or combine the pair of partial-view images. As a result, a spherical image is generated by the omnidirectional imaging device 10.

An overall configuration of the omnidirectional imaging device 10 according to the present embodiment is described below with reference to FIG. 1A to FIG. 3.

FIG. 1A is a diagram illustrating an external view of the omnidirectional imaging device 10 when viewed from a side, according to the present embodiment.

The omnidirectional imaging device 10 as illustrated in FIG. 1A is provided with an imaging body 12, a pair of image forming optical systems 20A and 20B that are integrated into the imaging body 12, a housing 14 that holds the imaging body 12 and components such as a controller 15 and a battery, and an operation key 18 that is arranged on the housing 14.

Figure 1B:
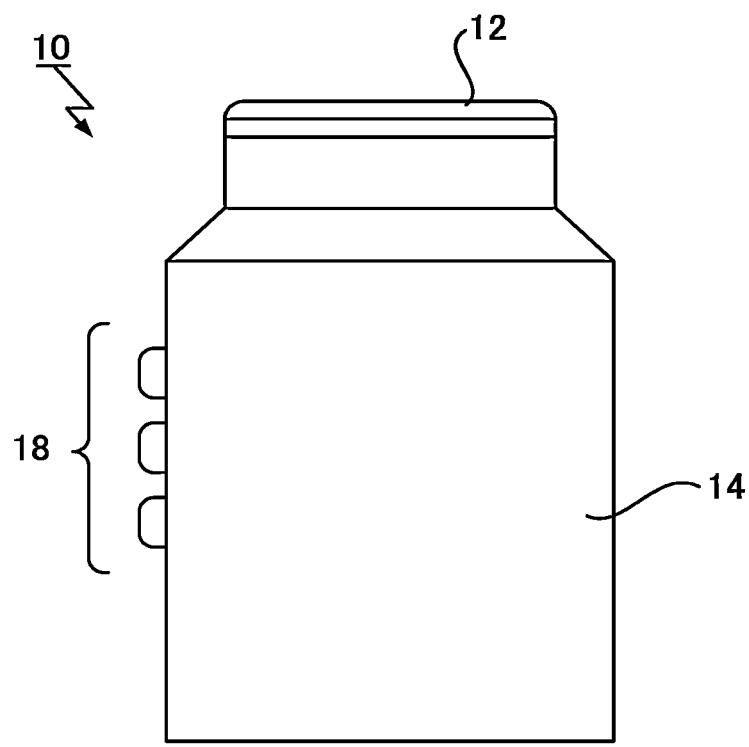

FIG. 1B is an external view of the omnidirectional imaging device 10 in a state where the imaging body 12 is accommodated inside the housing 14, according to the present embodiment.

In order to prevent dirt due to dust or the like on the pair of image forming optical systems 20A and 20B, the imaging body 12 of the omnidirectional imaging device 10 is configured so as to be movable in the up-and-down directions, and the imaging body 12 can be accommodated inside the housing 14 as illustrated in FIG. 1B when the device is not used.

Figure 1C:
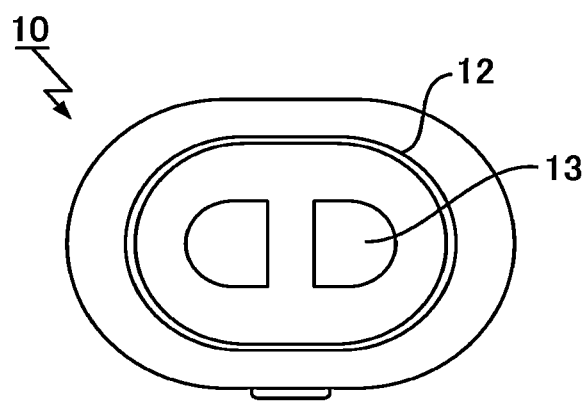

FIG. 1C is a top view of the omnidirectional imaging device 10 according to the present embodiment.

As illustrated in FIG. 1C, a cut portion (handle) 13 is provided on the upper side of the imaging body 12. Due to such a configuration, a user of the omnidirectional imaging device 10 can pull the cut portion 13 by finger to manually move the imaging body 12 in the up-and-down directions.

Figure 2A:
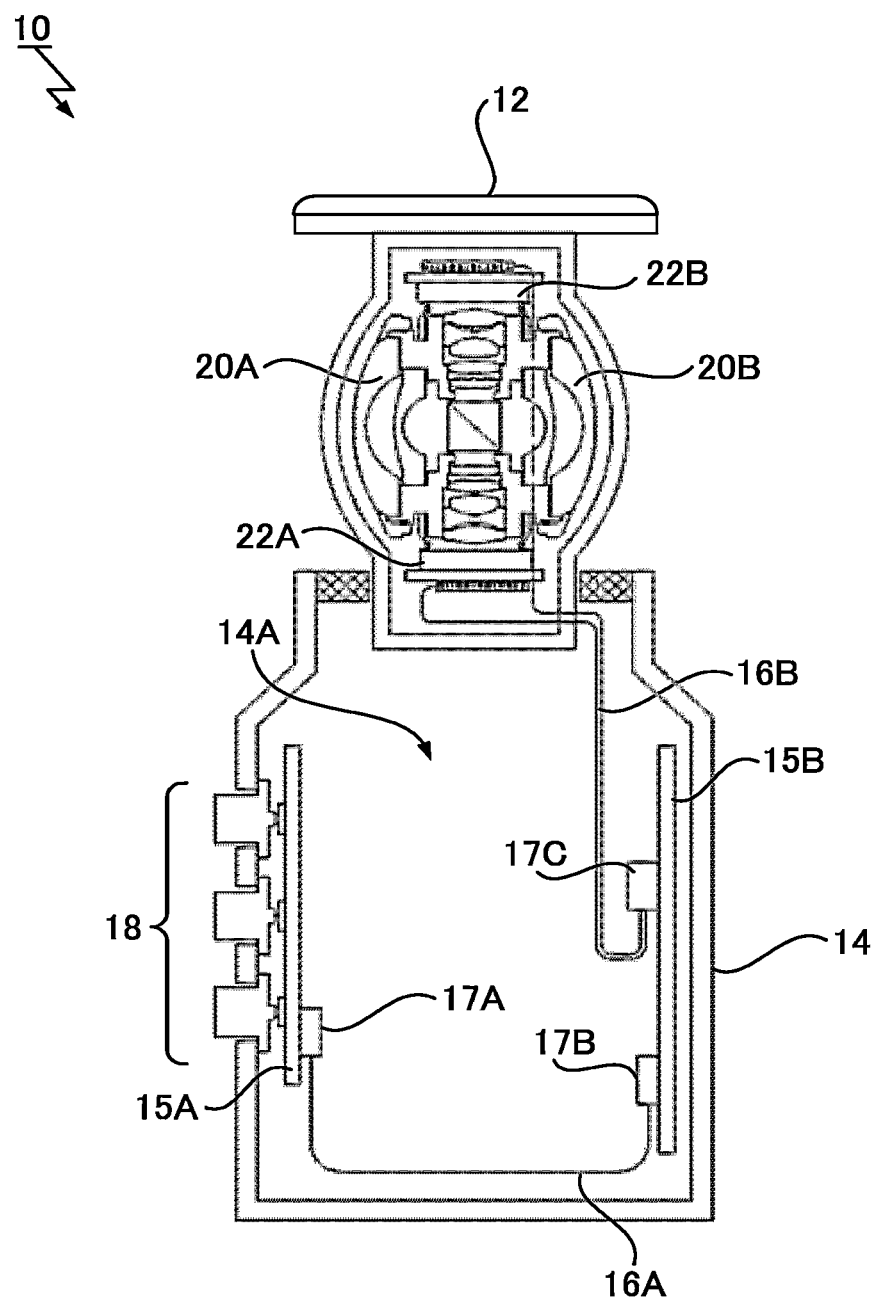
FIG. 2A and FIG. 2B are diagrams each illustrating a sectional view of an omnidirectional imaging device, according to embodiments of the present disclosure.
Figure 2B:
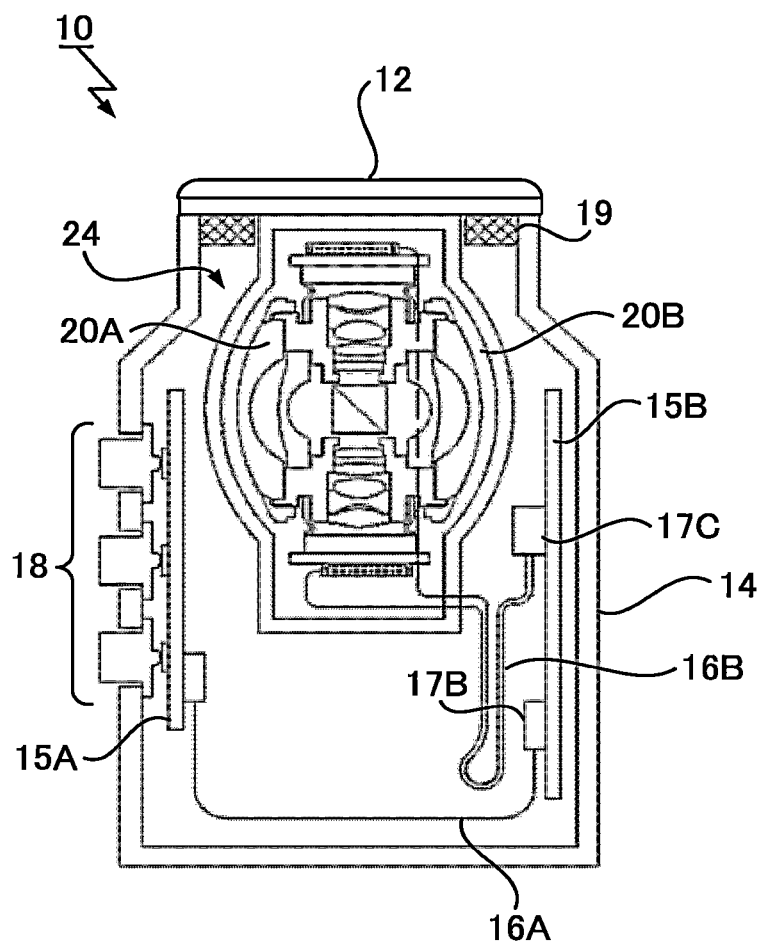

FIG. 2A and FIG. 2B are diagrams each illustrating a sectional view of the omnidirectional imaging device 10, according to the present embodiment.

More specifically, FIG. 2A illustrates a state of the omnidirectional imaging device 10 where the imaging body 12 is developed from the housing 14, and FIG. 2B illustrates a state of the omnidirectional imaging device 10 where the imaging body 12 is accommodated inside the housing 14.

The imaging body 12 as illustrated in FIG. 2A and FIG. 2B includes the pair of image forming optical systems 20A and 20B, and a pair of solid-state image sensing devices 22A and 22B such as a charge coupled device (CCD) sensor and a complementary metal oxide semiconductor (CMOS) sensor. A combination of one of the image forming optical systems 20A and 20B and one of the solid-state image sensing devices 22A and 22B is referred to as an imaging optical system. Each one of the image forming optical systems 20A and 20B may be configured as a fish-eye lens consisting of, for example, seven elements in six groups. In the present embodiment as illustrated in FIG. 1A, FIG. 1B, FIG. 1C, FIG. 2A, and FIG. 2B, the fish-eye lenses have a full angle of view wider than 180 degrees (=360 degrees/n, where n denotes the number of optical systems and n is 2). Preferably, each of the fish-eye lenses has an angle of view equal to or wider than 185 degrees, and even more preferably, each of the fish-eye lenses has an angle of view equal to or wider than 190 degrees.

The relative positions of the optical elements (lenses, prisms, filters, and aperture stops) of the two image forming optical systems 20A and 20B are determined with reference to the solid-state image sensing devices 22A and 22B. More specifically, positioning is made such that the optical axis of the optical elements of each of the image forming optical systems 20A and 20B is positioned at the central part of the light receiving area of corresponding one of the solid-state image sensing devices 22A and 22B orthogonally to the light receiving area, and such that the light receiving area serves as the imaging plane of corresponding one of the fish-eye lenses. Each one of the solid-state image sensing devices 22A and 22B is a two-dimensional solid-state image sensing device where the light receiving area corresponds to a capturing area, and converts the light that is concentrated by the corresponding one of the image forming optical systems 20A and 20B used in combination into an image signal.

In the embodiment as illustrated in FIG. 2A and FIG. 2B, the image forming optical systems 20A and 20B have the same specifications, and are combined in directions reverse to each other such that the optical axes thereof coincide with each other. The solid-state image sensing devices 22A and 22B convert the light distribution of the received light into an image signal, and sequentially output the obtained image signal to an image processing unit of the controller 15. As will be described later in detail, the partial-view images that are input from the respective solid-state image sensing devices 22A and 22B are joined or combined in the image processing unit so as to generate an image over a solid angle of $4\pi c$ radians, and such an image may be referred to as a spherical image in the following description. The spherical image is obtained by photographing all the directions viewable from a photographing location. In the present embodiment as illustrated in FIG. 2A and FIG. 2B, a spherical image is generated. However, no limitation is indicated thereby, and a panoramic image of 360 degrees along the horizontal plane may be generated, or a partial view of such a panoramic image may be generated.

A controller 15 is provided inside the housing 14 of the omnidirectional imaging device 10, and the controller 15 controls, for example, the control data input from the operation key 18, the execution of image processing on the image signals output from the solid-state image sensing devices 22A and 22B, and the input and output of the results of processing. In the present embodiment as illustrated in FIG. 2A and FIG. 2B, the controller 15 is divided into a plurality of controller boards 15A and 15B, and a plurality of connectors 17 including a connector 17A, a connector 17B, and a connector 17C are arranged on the controller board 15A and the controller board 15B. The controller board 15A and the controller board 15B are connected to each other by a cable 16A through the connector 17A and the connector 17B, and the controller board 15B is connected to the solid-state image sensing devices 22A and the solid-state image sensing device 22B by a cable 16B through the connector 17C. In the present embodiment, the cable 16A and the cable 16B are made of, for example, a flexible flat cable (FFC) or a flexible printed circuit (FPC).

As illustrated in FIG. 2B, an elastic member 19 such as a rubber or sponge is provided for the housing 14. The elastic member 19 prevents the pair of image forming optical systems 20A and 20B from being damaged and prevents the intrusion of dust or the like into the housing 14 when the imaging body 12 is accommodated inside the housing 14 or when the imaging body 12 is developed from the inside of the housing 14.

Figure 3A:
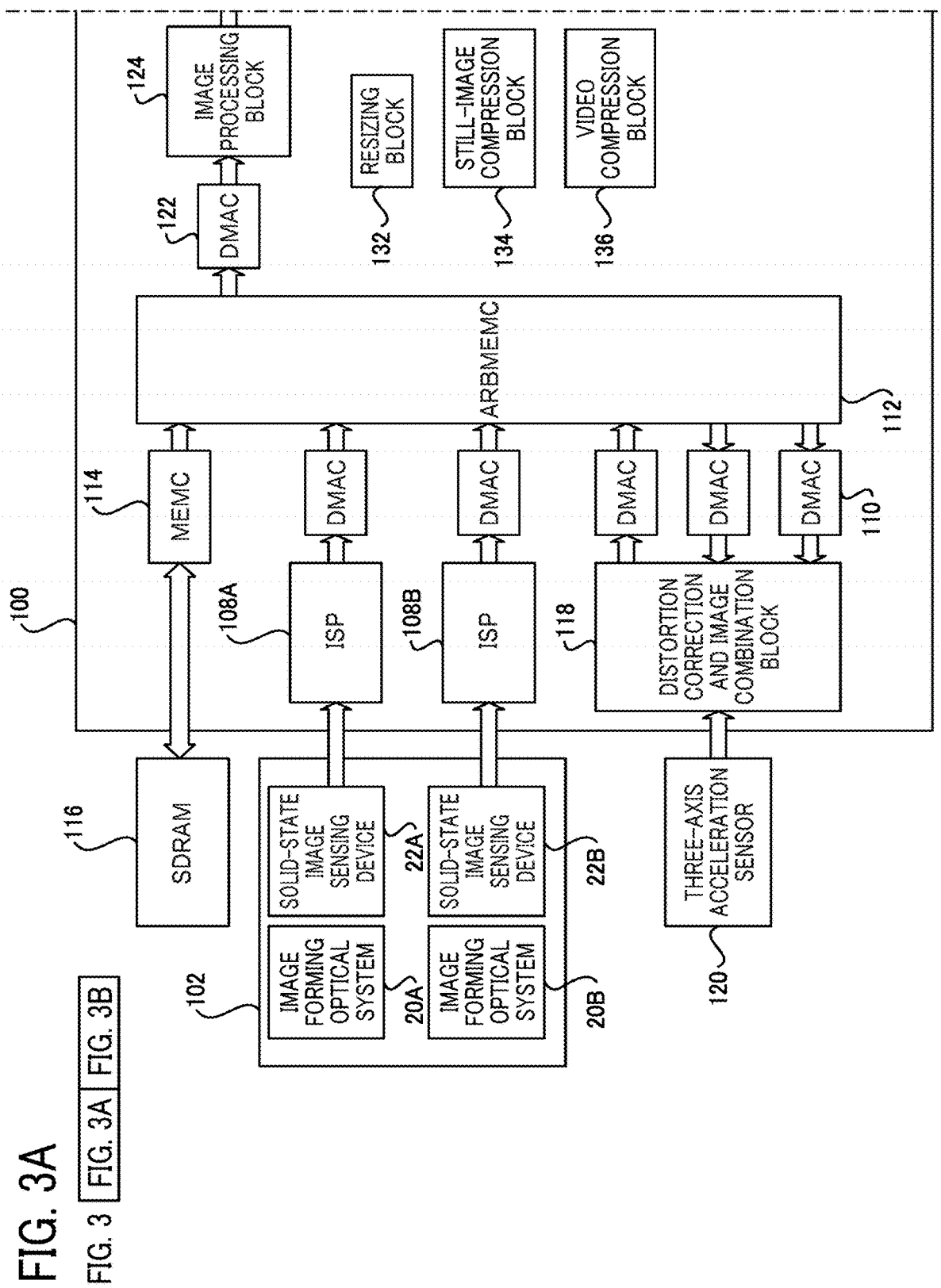
FIG. 3 including FIG. 3A
FIG. 3B is a block diagram of a hardware configuration of an omnidirectional imaging device according to embodiments of the present disclosure.
Figure 3B:
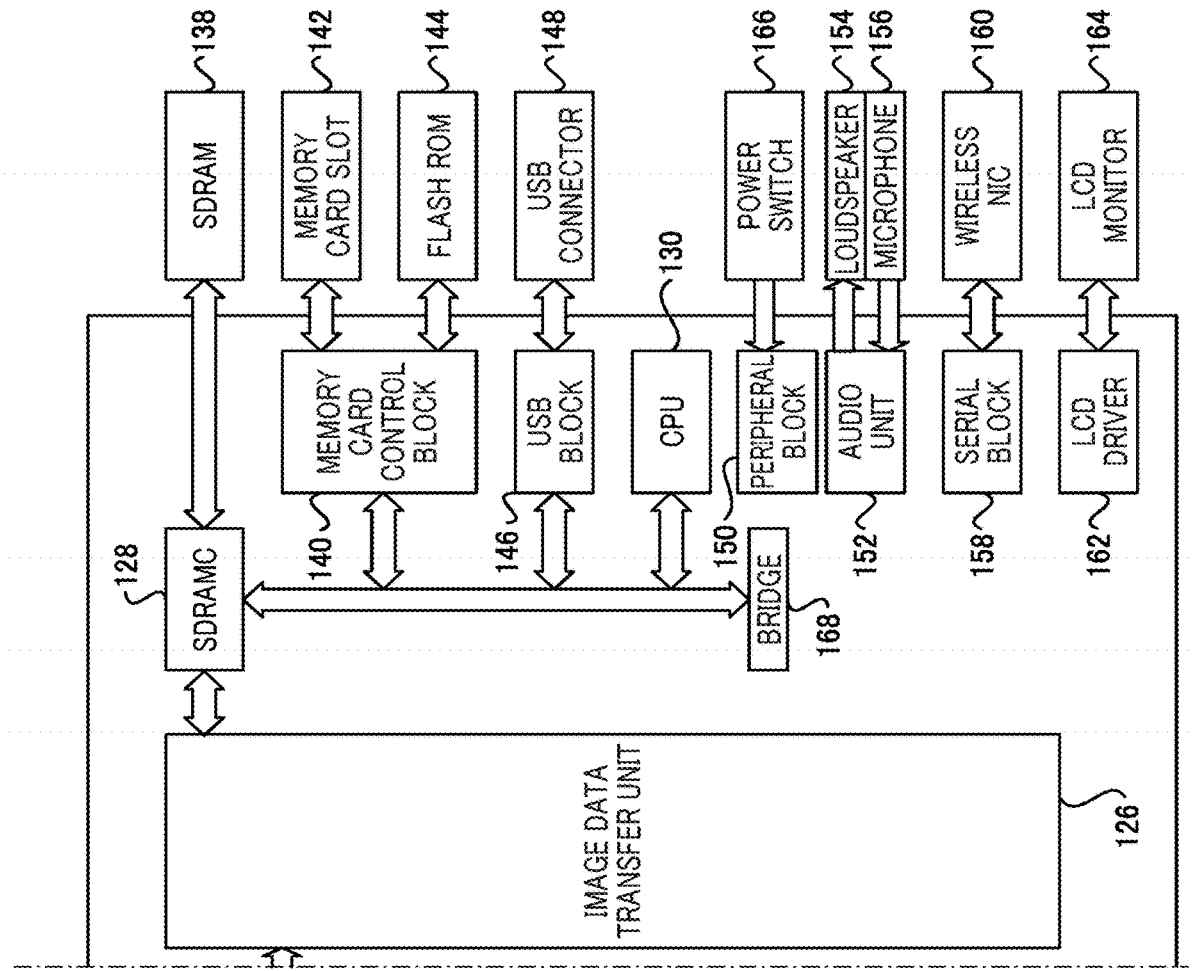

FIG. 3 is a block diagram of a hardware configuration of the omnidirectional imaging device 10 according to the present embodiment.

The omnidirectional imaging device 10 consist of a digital still camera processor 100, a barrel unit 102, and various kinds of components coupled to the processor 100. Note that such a digital still camera processor may be referred to simply as a processor 100 in the following description. The barrel unit 102 includes the pair of image forming optical systems 20A and 20B and the pair of solid-state image sensing devices 22A and 22B as described above. Each one of the solid-state image sensing devices 22A and 22B are controlled by control commands sent from a central processing unit (CPU) 130 provided inside the processor 100 which will be described later in detail.

The processor 100 includes an image signal processor (ISP) 108, a direct memory access controller (DMAC) 110, an arbiter or arbitration memory controller (ARBMEMC) 112 that mediates the memory access, a memory controller (MEMC) 114 that controls the memory access, and a distortion correction and image combination block 118. Each one of an image signal processor (ISP) 108A and an ISP 108B performs, for example, gamma correcting processes and white balance controlling processes on the image data on which signal processing has been performed by the solid-state image sensing devices 22A and 22B. A synchronous dynamic random access memory (SDRAM) 116 is coupled to the MEMC 114. The SDRAM 116 stores the data on a temporary basis while the data is being processed by the ISP 108A, the ISP 108B, and the distortion correction and image combination block 118. In order to obtain a composite image, the distortion correction and image combination block 118 performs distortion correction and up-and-down direction correction on the pair of partial-view images obtained from the pair of imaging optical systems, based on the data output from a sensor such as a three-axis acceleration sensor 120, a gyroscope sensor, and an electronic compass.

Moreover, the processor 100 includes a direct memory access controller (DMAC) 122, an image processing block 124, the CPU 130, an image data transfer unit 126, a synchronous dynamic random access memory controller (SDRAMC) 128, a memory card control block 140, a universal serial bus (USB) block 146, a peripheral block 150, an audio unit 152, a serial block 158, a liquid crystal display (LCD) driver 162, and a bridge 168.

The CPU 130 controls the operation of each element of the omnidirectional imaging device 10. The image processing block 124 performs various kinds of image processing on the image data, using, for example, a resizing block 132, a still-image compression block 134, and a video compression block 136. The resizing block 132 increases or decreases the size of the image data by interpolation processes. The still-image compression block 134 is a codec block for compressing or expanding a still image so as to change the format of the still image to a still-image format such as a joint photographic experts group (JPEG) and a tagged image file format (TIFF). The video compression block 136 is a codec block for compressing or expanding moving images so as to change the format of the moving images to a video format such as a moving picture experts group (MPEG)-4 advanced video coding (AVC)/H.264. The image data transfer unit 126 transfers the image that has been processed by the image processing block 124. The SDRAMC 128 controls the SDRAM 138 coupled to the processor 100, and the SDRAM 138 stores the image data on a temporary basis while various kinds of image processing is being performed on the image data inside the processor 100.

The memory card control block 140 controls reading and writing to a flash read-only memory (ROM) 144 a memory card that is inserted into a memory card slot 142. The memory card slot 142 enables a memory card to be inserted into the omnidirectional imaging device 10 in a detachable manner. The USB block 146 controls USB communication with an external device such as a personal computer (PC) coupled through the USB connector 148. A power switch 166 is coupled to the peripheral block 150. The audio unit 152 is coupled to a microphone 156 to which an audio signal is input by a user, and a loudspeaker 154 from which the recorded audio signal is output, and controls the input and output of the audio data. The serial block 158 controls serial communication with an external device such as a PC, and is coupled to a wireless network interface card (NIC) 160. The LCD driver 162 drives the LCD monitor 164, and converts the image signals into signals such that the LCD monitor 164 can display thereon various kinds of conditions.

The flash ROM 144 stores therein various kinds of parameters and a control program written in a code readable by the CPU 130. When the power is turned on by the operation of the power switch 166, the control program mentioned above is loaded into the main memory. The CPU 130 follows the program read into the main memory to control the operations of the parts of the device, and temporarily stores the data required for the control in the SDRAM 138 and a local static random access memory (SRAM).

Figure 4:
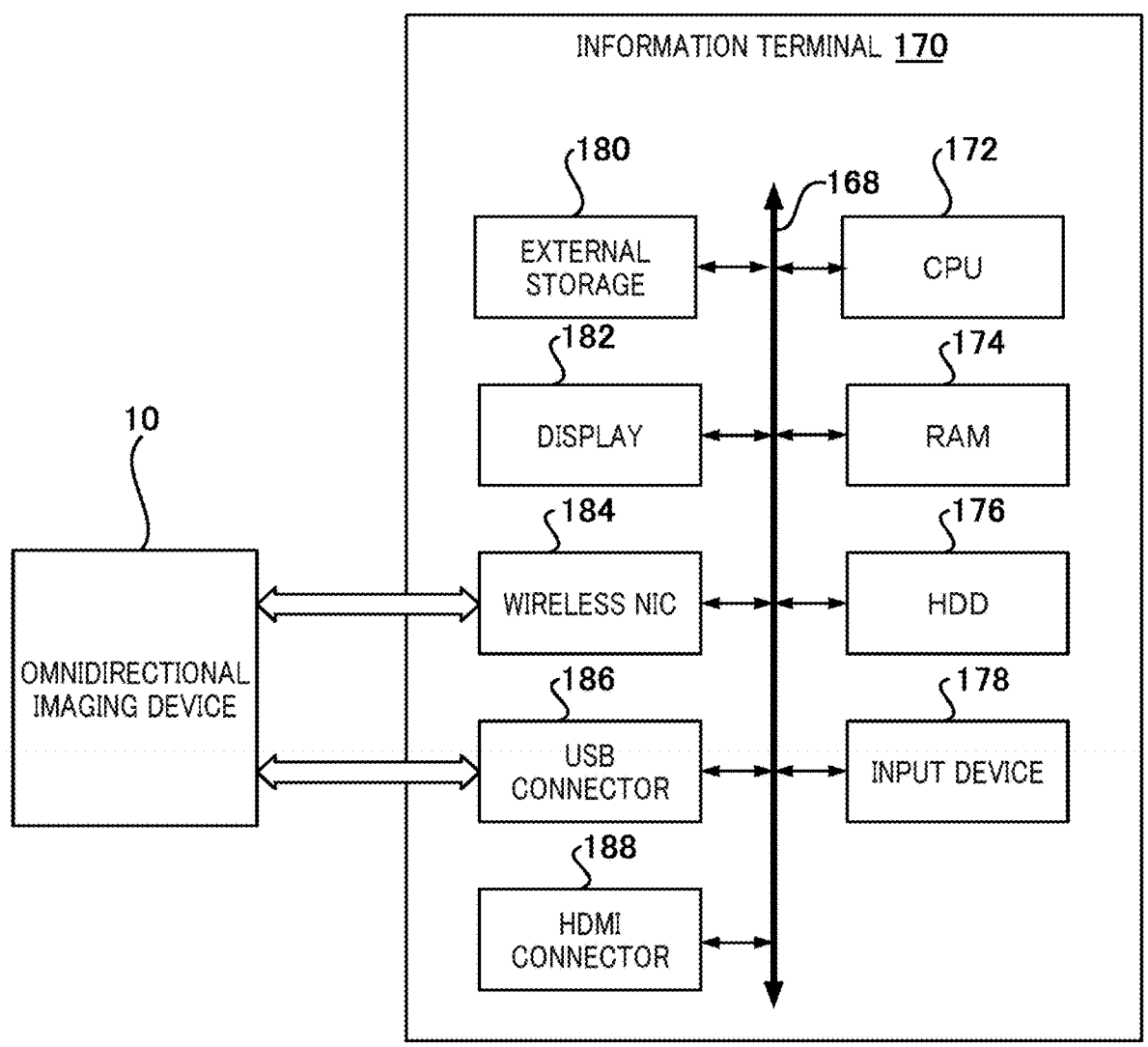
FIG. 4 is a block diagram of a hardware configuration of an information terminal that controls an omnidirectional imaging device, according to embodiments of the present disclosure.

FIG. 4 is a block diagram of a hardware configuration of an information terminal 170 that controls the omnidirectional imaging device 10, according to the present embodiment.

The information terminal 170 as illustrated in FIG. 4 includes a central processing unit (CPU) 172, a random access memory (RAM) 174, a hard disk drive (HDD) 176, an input device 178, an external storage 180, a display 182, a wireless network interface card (NIC) 184, a universal serial bus (USB) connector 186, and a high-definition multimedia interface (HDMI, registered trademark) connector 188.

The CPU 172 controls the operations of components of the information terminal 170, or controls the overall operations of the information terminal 170. The RAM 174 provides a work area for the CPU 172. The HDD 176 stores therein an operating system and a control program, such as an application, that executes processes in the information terminal 170 according to the present embodiment, and each of the operating system and the control program is written in a code decodable by the CPU 172.

The input devices 178 are input devices, such as a mouse, a keyboard, a touchpad, and a touchscreen, and provide a user interface. The external storage 180 is a removable recording medium mounted, for example, in a memory card slot, and records various types of data, such as image data in a video format and still image data. The wireless NIC 184 establishes a connection for wireless LAN communication with an external device such as the omnidirectional imaging device 10. The USB connector 186 establishes a USB connection to an external device such as the omnidirectional imaging device 10. By way of example, the wireless NIC 184 and the USB connector 186 are described. However, limitation to any specific standard is not intended, and connection to an external device may be established through another wireless connection such as Bluetooth (registered trademark) and wireless USB or through a wired connection such as wired local area network (LAN).

The display 182 displays an operation screen, the monitor image of the images captured by the omnidirectional imaging device 10 that is ready to capture an image or is capturing an image, and the stored moving images or still images for reproducing or viewing. The display 182 and the input device 178 enable, through the operation screen, making instructions for image capturing or changing various kinds of setting in the omnidirectional imaging device 10. These moving images or still images can be output to a display interface such as an external display and a projector through a high-definition multimedia interface (HDMI, registered trademark) connector 188. Note that the HDMI connector 188 is given just as an example, and no limitation to any specific standard is intended thereby. Alternatively, DisplayPort (registered trademark) or digital video interactive (DVI) connector may be used.

When power is supplied to the information terminal 170 and the power thereof is turned on, the program is read from a ROM or the HDD 176, and loaded into the RAM 174. The CPU 172 follows the program read into the RAM 174 to control the operations of the parts of the device, and temporarily stores the data required for the control in the memory. This operation implements functional units and processes of the information terminal 170, as will be described later.

The omnidirectional image and video generating function of the omnidirectional imaging device 10 according to the present embodiment is described below in detail with reference to FIG. 5 to FIG. 15.

Figure 5:
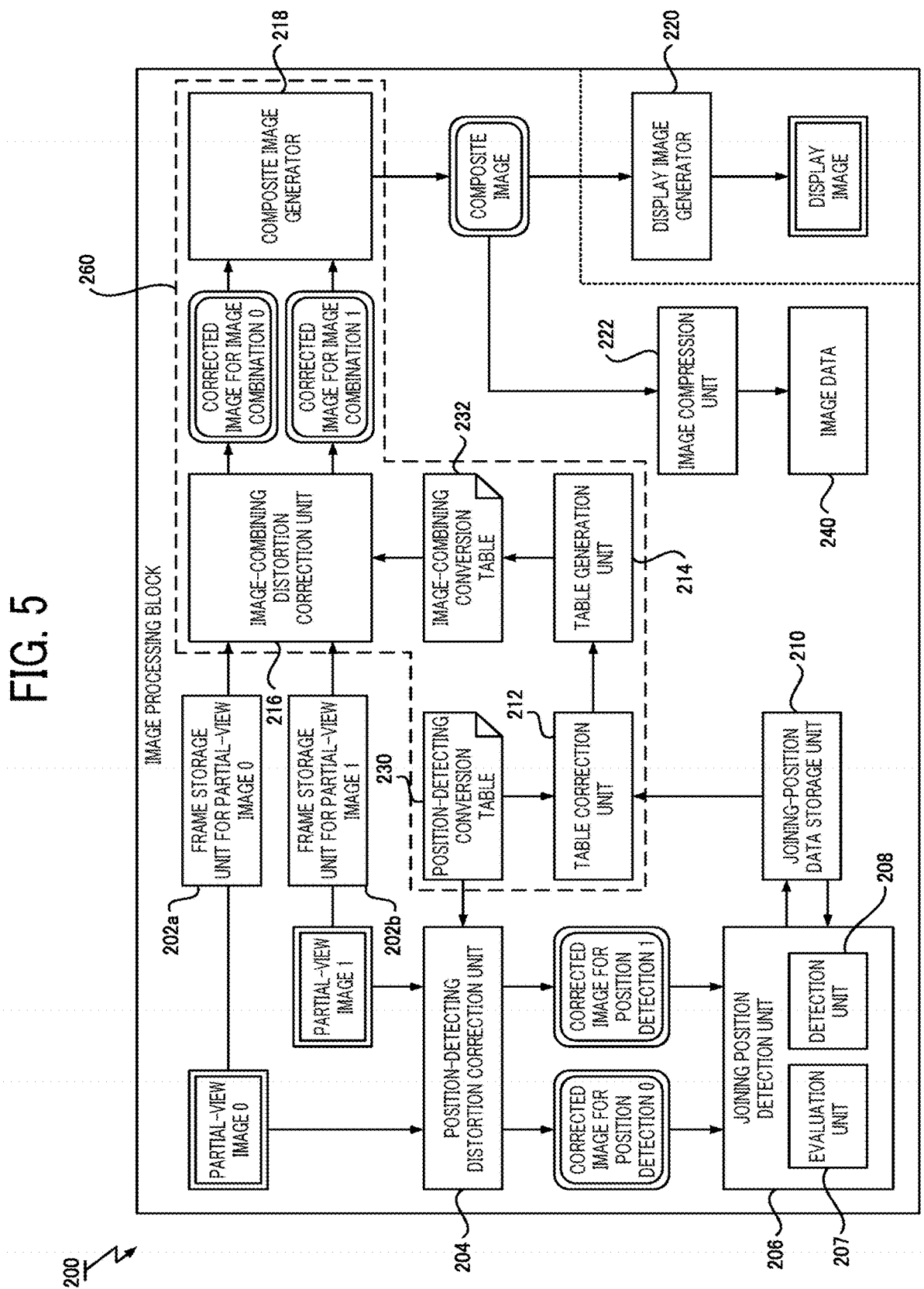
FIG. 5 is a diagram illustrating schematic functional blocks of the omnidirectional image and video generating processes implemented on an omnidirectional imaging device, according to embodiments of the present disclosure.

FIG. 5 is a diagram illustrating schematic functional blocks of the omnidirectional image and video generating processes implemented on the omnidirectional imaging device 10, according to the present embodiment. As illustrated in FIG. 5, the image processing block 200 includes a frame storage unit 202, a position-detecting distortion correction unit 204, a joining-position detection unit 206, a joining-position data storage unit 210, a table correction unit 212, a table generation unit 214, an image-combining distortion correction unit 216, and a composite image generator 218.

To the image processing block 200, a pair of partial-view images that have gone through various kinds of image signal processing are input from the pair of solid-state image sensing devices 22A and 22B for each frame. Such a unit that receives the input of a pair of partial-view images for each frame configures an image input unit in the present embodiment. In the present embodiment, the image frame that is derived from the solid-state image sensing device 22A as a source is referred to as a "partial-view image 0", and the image frame that is derived from the solid-state image sensing device 22B as a source is referred to as a "partial-view image 1." In the image processing block 200, a position-detecting conversion table 230 is further provided that is generated in advance by the manufacturer or the like according to a prescribed projection model and the design data or the like of each of the lens optical systems. The position-detecting conversion table 230 may serve a table that corrects the distortion of a fish-eye lens, and thus may be referred to as a distortion correction table in the following description.

As a preliminary process prior to the joining-position detection process, the position-detecting distortion correction unit 204 performs distortion correction on the received partial-view image 0 and partial-view image 1 using the position-detecting conversion table 230, and generates a corrected image for image detection 0 and a corrected image for image detection 1. Note that such a corrected image for position detection may be referred to simply as a corrected image in the following description. The input partial-view images 0 and 1 are image data that is expressed by a planar coordinate system (x, y). By contrast, the corrected images where the distortion is corrected using the position-detecting conversion table 230 is image data in an omnidirectional image format expressed by a spherical coordinate system (i.e., a polar coordinate system having the radius vector of 1 and two angles of deviation θ and φ).

Figure 7A:
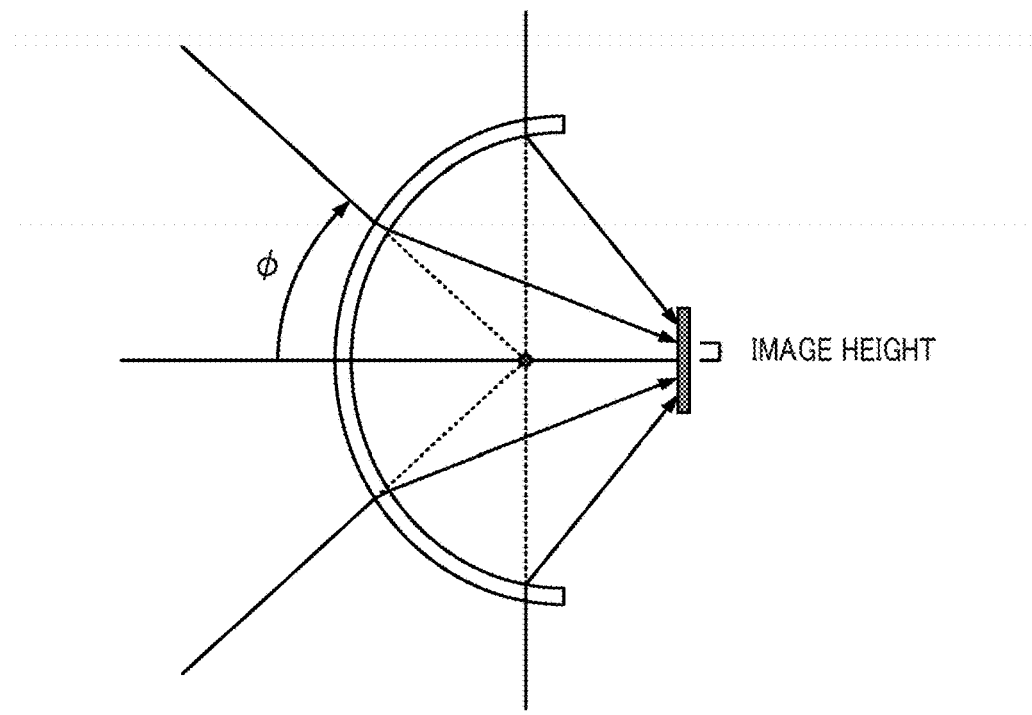
FIG. 7A and FIG. 7B are diagrams each illustrating a projection relation in an omnidirectional imaging device according to embodiments of the present disclosure.
Figure 7B:
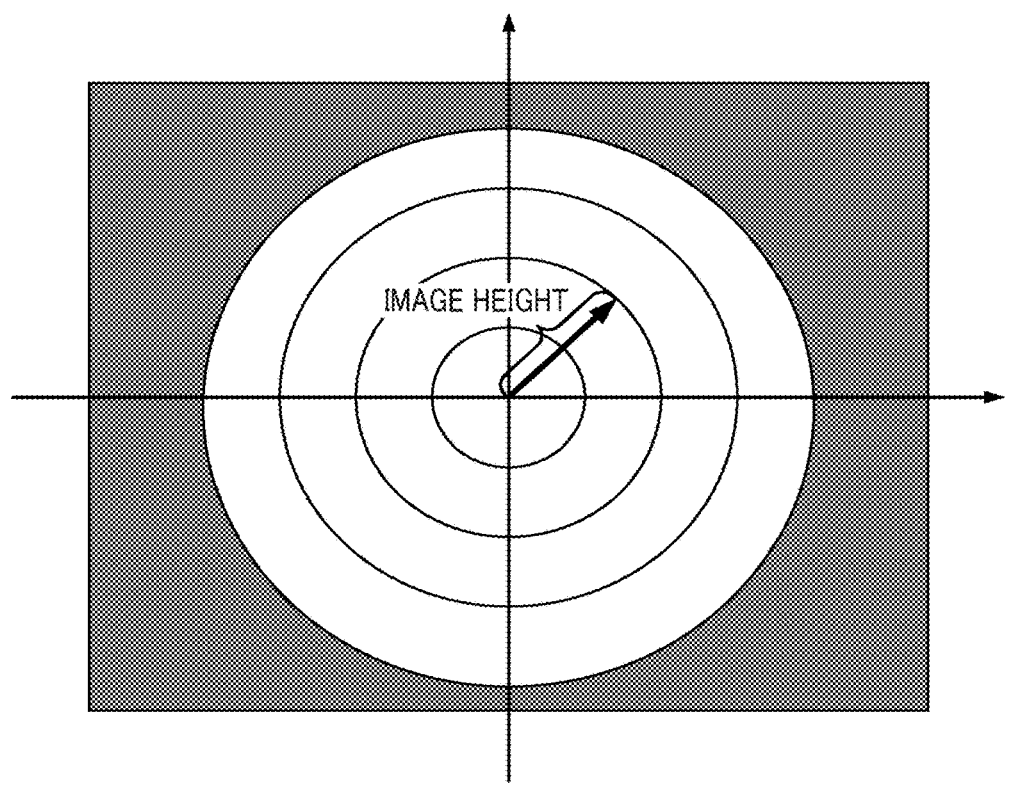

FIG. 7A and FIG. 7B are diagrams each illustrating a projection relation in the omnidirectional imaging device 10, according to the present embodiment. In the present embodiment, an image captured by one fish-eye lens is an image obtained by capturing an orientation range of substantially a hemisphere with reference to a photographing location. As illustrated in FIG. 7A, the fish-eye lens generates an image having an image height h that corresponds to an angle of incidence φ with reference to the optical axis. The relation between the image height h and the angle of incidence φ is determined by a projection function according to a prescribed projection model. The projection function varies according to the properties and characteristics of the fish-eye lens. The above projection model may be any of the equidistant projection (h=f×φ), the central projection (h=f×tan φ), the stereographic projection (h=2f×tan (φ/2)), the equi-solid-angle projection (h=2f×tan (φ/2)), and the orthogonal projection (h=f×sin φ). In any of the projections, the image height h of a formed image is determined according to the incident angle φ and the focal length f with reference to the optical axis. In the embodiment described below, the configuration of a so-called circular fish-eye lens that has an image circle diameter shorter than a diagonal line of the image is adopted. As illustrated in FIG. 7B, the partial-view image obtained from the lens is a planar image including the entire image circle obtained by projecting the captured range of substantially a hemisphere.

Figure 8A:
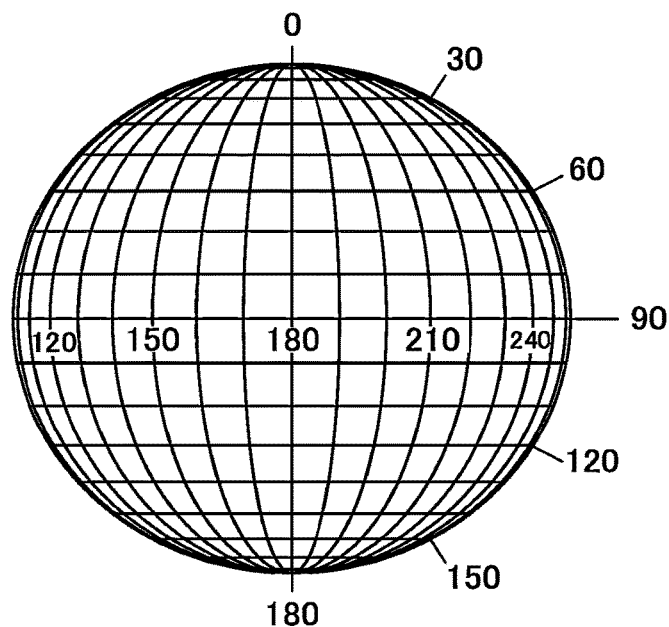
FIG. 8A and FIG. 8B are diagrams illustrating the data structure of image data in an omnidirectional image format, according to embodiments of the present disclosure.
Figure 8B:
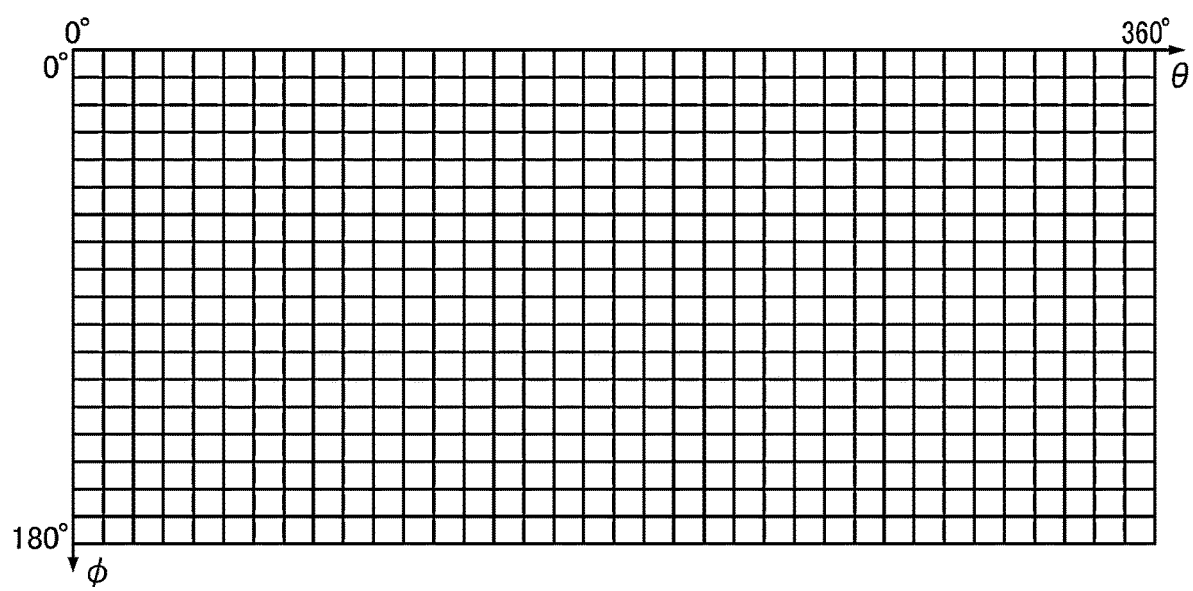

FIG. 8A and FIG. 8B are diagrams illustrating the data structure of image data in an omnidirectional image format, according to the present embodiment. As illustrated in FIG. 8A and FIG. 8B, the image data in an omnidirectional image format is expressed as an array of pixel values where the vertical angle φ corresponding to the angle with reference to a certain axis and the horizontal angle θ corresponding to the above angle of rotation around the axis are the coordinates. The horizontal angle θ may range from 0 to 360 degrees. Alternatively, it can be expressed that the horizontal angle θ may range from −180 to +180 degrees. In a similar manner, the vertical angle φ may range from 0 to 180 degrees. Alternatively, it can be expressed that the vertical angle φ may range from −90 to +90 degrees. The coordinate values (θ, φ) are associated with the multiple points on the spherical surface indicating all directions around the photographing location, and the all directions are mapped on the omnidirectional image (spherical image). The planar coordinates of an image that is captured by a fish-eye lens can be associated with the spherical coordinates of the image in the omnidirectional image format, using the projection function as described above with reference to FIG. 7A and FIG. 7B.

Figure 9B:
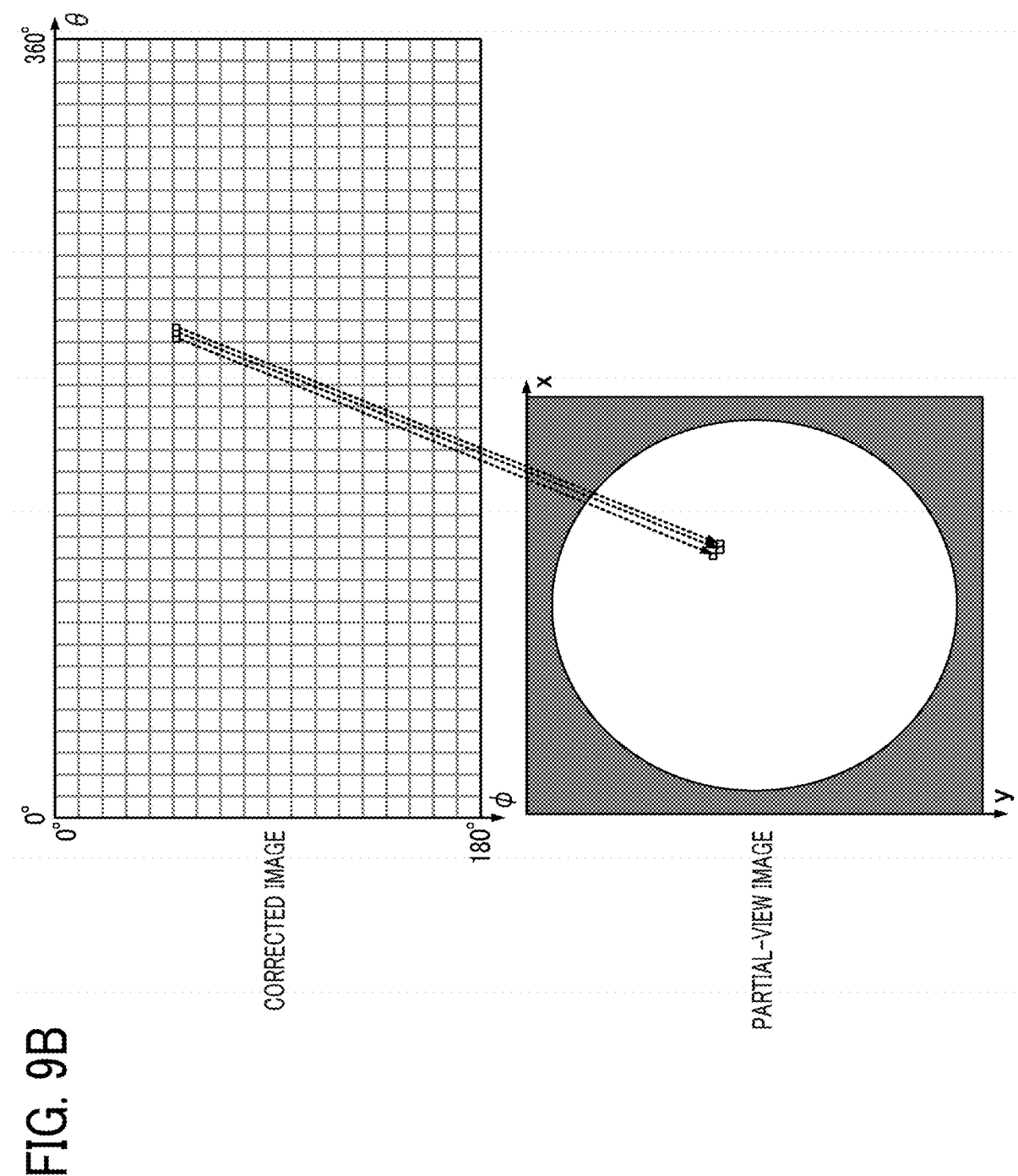

FIG. 9A and FIG. 9B are diagrams illustrating the conversion data that the position-detecting distortion correction unit 204 and the image-combining distortion correction unit 216 refer to, according to the present embodiment. The position-detecting conversion table 230 and the image-combining conversion table 232 provide for the projection of partial-view images expressed in a planar coordinate system as an image expressed in a spherical coordinate system. As illustrated in FIG. 9A and FIG. 9B, for each fish-eye lens, the position-detecting conversion table 230 and the image-combining conversion table 232 provides for the associating information between the coordinate values (θ, φ) of the post-correction images and the coordinate values (x, y) of the pre-correction partial-view images that are mapped on the coordinate values (θ, φ), for all the coordinate values (θ, φ), where θ denotes 0 to 360 degrees, and φ denotes 0 to 180 degrees. In the illustration of FIG. 9A and FIG. 9B, the angle of each one of the pixels is one-tenths of a degree in both φ direction and θ direction, and the position-detecting conversion table 230 and the image-combining conversion table 232 include the data indicating the 3600×1800 corresponding relation for each fish-eye lens.

The position-detecting conversion table 230 that is used for the joining position detection is created by calculating and tabulating the value upon correcting the distortion from an optimal lens model in advance by a manufacturer or the like. By contrast, the image-combining conversion table 232 is generated upon predetermined conversion processes that are performed based on the position-detecting conversion table 230. The details of such processes are described later.

Figure 10:
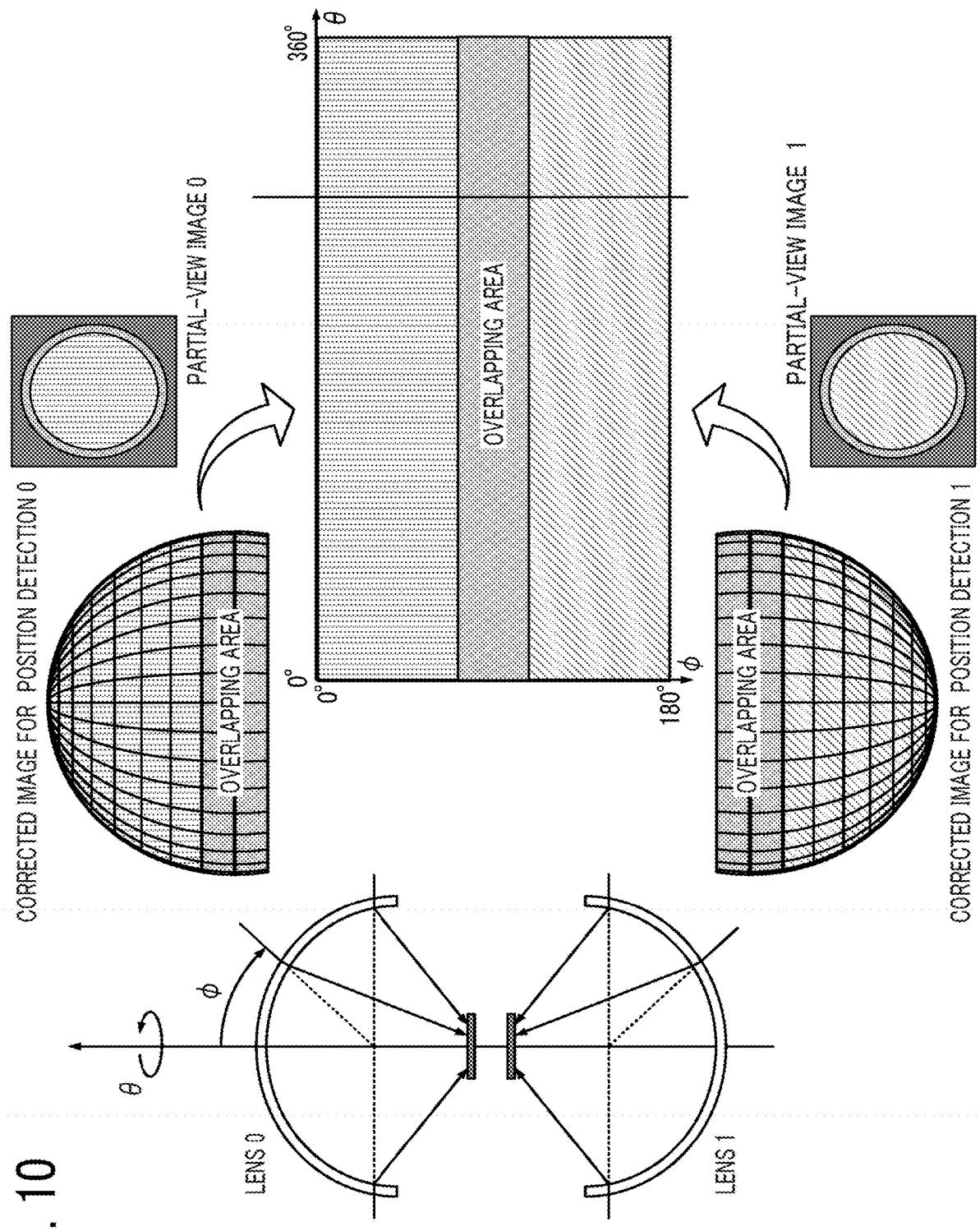
FIG. 10 is a diagram illustrating the mapping of a pair of partial-view images captured by a pair of fish-eye lenses on a spherical coordinate system in the position-detecting process, according to embodiments of the present invention.

FIG. 10 is a diagram illustrating the mapping of a pair of partial-view images captured by a pair of fish-eye lenses on a spherical coordinate system in the position-detecting process, according to the present embodiment.

As the result of the process performed by the position-detecting distortion correction unit 204, as illustrated in FIG. 10, the pair of partial-view images 0 and 1 that are captured by the pair of fish-eye lenses are developed in an omnidirectional image format. Typically, the partial-view image 0 that is captured by the fish-eye lens 0 is approximately mapped on an upper hemisphere of the whole sphere, and the partial-view image 1 that is captured by the fish-eye lens 1 is approximately mapped on a lower hemisphere of the whole sphere. As the full angles of view of the fish-eye lenses exceed 180 degrees, each of the corrected image 0 and the corrected image 1 that are expressed in an omnidirectional image format lies off the hemisphere. For this reason, when the corrected image 0 and the corrected image 1 are superimposed on top of one another, an overlapping area occurs in which the captured ranges of these two images overlap with each other.

As a preliminary process, the format of a plurality of partial-view images is converted into an omnidirectional image format. Due to this configuration, after such conversion, a joining position on the overlapping area as illustrated in FIG. 10 can be detected. In the present embodiment as illustrated in FIG. 5, a spherical image that is used for generating a composite image is generated independently from a spherical image used for positioning corrections. Such a way of generating a spherical image is described below with reference to FIG. 5.

After the correction is performed by the position-detecting distortion correction unit 204, a joining position between a pair of images is detected by the joining-position detection unit 206 for each of the multiple portions set in the above-described overlapping area. The position-detecting conversion table 230 according to the present embodiment is generated such that, as illustrated in FIG. 10, the optical axes of the two lens optical systems are projected onto the two poles of the spherical surface (q) denotes 0 or 180 degrees) and the overlapping area between the two images is projected near the equator of the spherical surface ($\varphi=90$ degrees±((full angle of view−180 degrees)/2)).

In the spherical coordinate system, the distortion increases as the coordinate gets closer to the pole where the vertical angle $\varphi$ is 0 degree or 180 degrees, and the accuracy of the joining position detection deteriorates. By contrast, in the present embodiment where the projection is controlled as described above, the overlapping area is moved to an area around the vertical angle, i.e., 90 degrees, where the amount of distortion when the shifting occurs in the θ-direction is small, and a joining position on the overlapping area is detected. Due to such a configuration, the accuracy of the joining position detection can be improved. Moreover, even the joining position on an image that is captured by a lens optical system with relatively large distortion can be detected with a high degree of precision.

In the present embodiment, the joining-position detection unit 206 performs pattern matching for detecting the joining position between the corrected image 0 and corrected image 1 for each one of the multiple portions upon receiving the corrected image 0 and corrected image 1 converted by the position-detecting distortion correction unit 204, and generates joining-position data for each one of the multiple portions. The joining-position data storage unit 210 temporarily stores the joining-position data for each one of the multiple portions detected by the joining-position detection unit 206. The joining-position data storage unit 210 according to the present embodiment serves as a storage unit in the present disclosure.

The joining-position detection unit 206 according to the present embodiment is not configured to detect a joining position on all the multiple portions of all the frames. Instead of such a configuration, the joining-position detection unit 206 according to the present embodiment is configured to detect the joining position on a site that meets a predetermined condition and to omit the detection of joining position where unnecessary. More specifically, the joining-position detection unit 206 as illustrated in FIG. 5 includes an evaluation unit 207 and a detection unit 208. The evaluation unit 207, the detection unit 208, and the processes of obtaining a joining position in an efficient manner using these elements including the evaluation unit 207 and the detection unit 208 will be described later in detail.

The table correction unit 212 corrects the prepared position-detecting conversion table 230 based on the joining-position data obtained for each one of the multiple portions, and passes the corrected position-detecting conversion table 230 to the table generation unit 214. The table generation unit 214 generates an image-combining conversion table 232 according to the rotational coordinate transformation and the post-conversion data corrected by the above table correction unit 212.

As a preliminary process prior to the image-combining process, the image-combining distortion correction unit 216 performs distortion correction on the original partial-view image 0 and partial-view image 1 using the image-combining conversion table 232, and generates a corrected image for image combination 0 and a corrected image for image combination 1. In the present embodiment, the partial-view image 0 and the partial-view image 1 to be processed correspond to the frame stored in the frame storage unit 202.

In a similar manner to the corrected image for position detection, the generated corrected image for image combination 0 and corrected image for image combination 1 are expressed as a spherical coordinate system. However, the definition of the coordinate axis in the generated corrected image for image combination 0 and corrected image for image combination 1 is different from that of the corrected image for position detection due to the rotational coordinate transformation.

Figure 15:
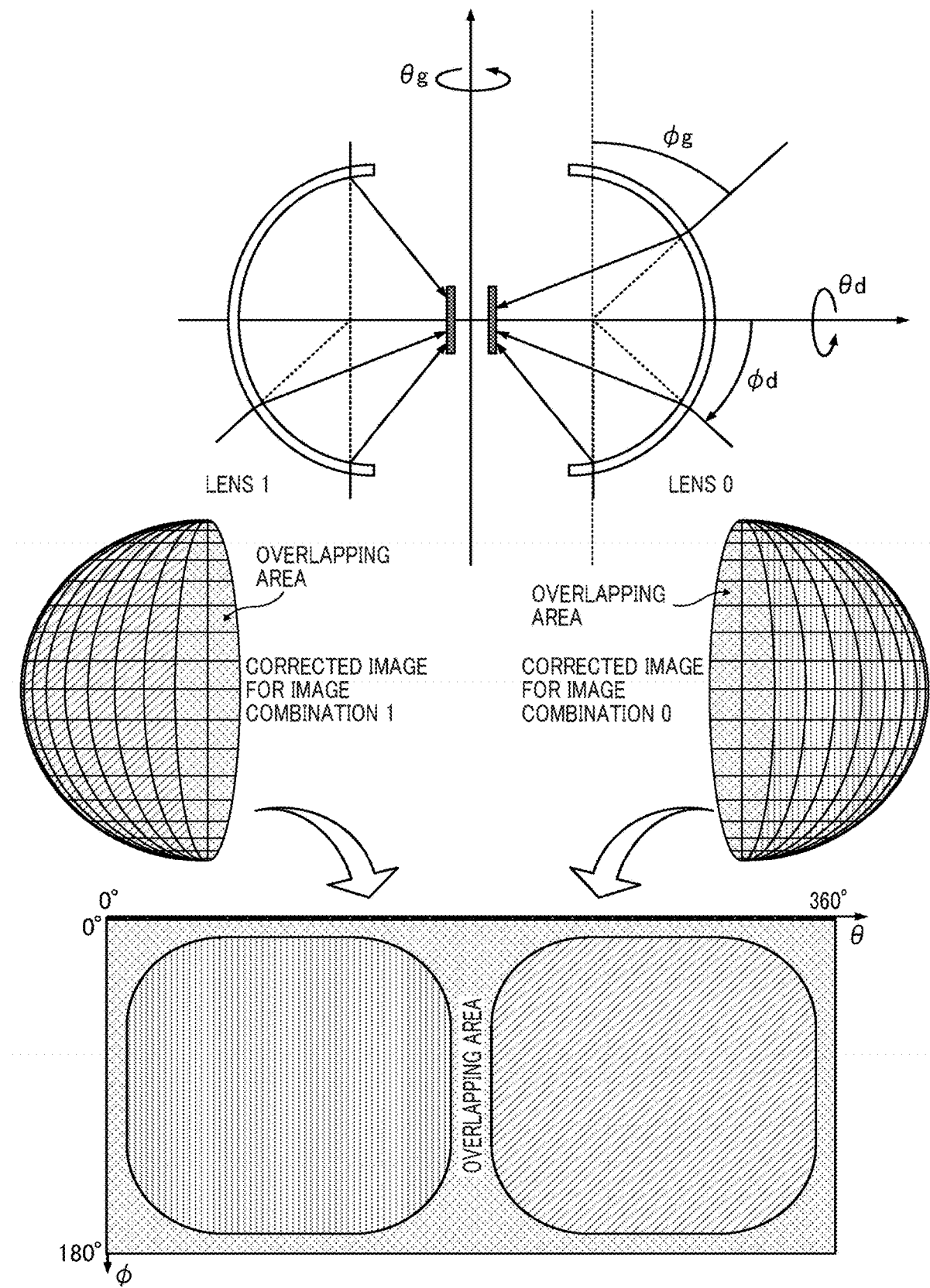
FIG. 15 is a diagram illustrating the mapping of the pair of partial-view images captured by a pair of fish-eye lenses on the spherical coordinate system in the image-combining process, according to embodiments of the present disclosure.

FIG. 15 is a diagram illustrating the mapping of the pair of partial-view images captured by a pair of fish-eye lenses on the spherical coordinate system in the image-combining process, according to the present embodiment. Due to the rotational coordinate transformation as described above, the definition of the coordinates of the horizontal angle and vertical angle with reference to the optical axis of one of the lens optical systems, as illustrated in FIG. 10, is converted into the definition of the coordinates of the horizontal angle and vertical angle with reference to the axis perpendicular to the optical system, as illustrated in FIG. 15. Accordingly, as a result of the process performed by the image-combining distortion correction unit 216, as illustrated in FIG. 15, the two partial-view images 0 and 1 that are captured by the fish-eye lenses are developed in an omnidirectional image format. Typically, the partial-view image 0 that is captured by the fish-eye lens 0 is approximately mapped on a left hemisphere of the whole sphere, and the partial-view image 1 that is captured by the fish-eye lens 1 is approximately mapped on a right hemisphere of the whole sphere.

As apparent from the comparisons between FIG. 15 and FIG. 10, the partial-view image 0 and the partial-view image 1 are mapped on different positions of a pair of corrected images for image combination compared with the omnidirectional image format for adjusting or correcting the positions, and the zenith direction of the captured scene matches the φ-direction that indicates the up-and-down direction of the images. The central parts of the partial-view image 0 and the partial-view image 1 are mapped on the equator where the distortion is smaller than those of the central parts of the partial-view image 0 and the partial-view image 1, and the periphery that corresponds to the overlapping area between the corrected image for position detection 0 and the corrected image for position detection 1 is mapped around an area of 0 degree and 180 degrees in the vertical angle and around an area of 0 degree and 180 degrees in the horizontal angle.

The composite image generator 218 combines the obtained corrected image for image combination 0 and corrected image for image combination 1 to generate a frame for the composite image in an omnidirectional image format.

The image processing block 200 as illustrated in FIG. 5 may further include a display image generator 220. The composite image that is generated as above is expressed in an omnidirectional image format. For this reason, if such a composite image is displayed on a planar display device such as a display just as it is, the distortion increases as the coordinate is in closer proximity to the pole where the vertical angle φ is 0 degree or 180 degrees, and the accuracy of the joining position detection deteriorates. In the present embodiment, the display image generator 220 performs image processing on the spherical image so as to be optimized for the projection on a planar display device.

In the present embodiment, the display image generator 220 can modify, for example, a composite image in an omnidirectional image format such that the spherical coordinate system is sequentially converted into a planar coordinate system of a specified direction and angle of view, and can project the modified image on a frame of such a specific field-of-view direction and angle of view. Accordingly, an image or moving images that simulates a specific point of view and field of view can be monitored.

The image processing block 200 as illustrated in FIG. 5 may further include an image compression unit 222. The image compression unit 222 receives a series of images including a plurality of composite frames that are obtained by combining a plurality of spherical images, and the image compression unit 222 can perform video compression on the received series of images to generate video data in which each one of the multiple composite frames that make up the series of images serves as a frame, and can write out image data 240 of the generated video data. Alternatively, the image compression unit 222 can write out the image data 240 of still images based on the multiple composite frames that are obtained by combining a plurality of spherical images. When the multiple composite frames that are obtained by combining a plurality of spherical images are to be stored as still images, the image compression unit 222 uses the still-image compression block 134 to compress the image data to image data in a still image format such as joint photographic experts group (JPEG) format or a tagged image file format (TIFF). When the multiple composite frames that are obtained by combining a plurality of spherical images are to be stored as video data, the image compression unit 222 uses the video compression block 136 to compress the image data to image data in a video format such as moving picture experts group (MPEG)-4 advanced video coding (AVC)/H.264 format. The generated image data 240 is stored in the storage area of an external storage such as a memory card through the memory card slot 142.

The table correction unit 212, the table generation unit 214, the image-combining distortion correction unit 216, and the composite image generator 218 that are used to generate and output a final composite spherical image may together configure a composite-image generating unit according to the present disclosure, and such a composite-image generating unit as indicated by broken lines 260 in FIG. 5 receives a pair of partial-view images 0 and 1 and the joining-position data for each one of the multiple portions stored in the joining-position data storage unit 210.

A flowchart of the omnidirectional image and video generating processes according to the present embodiment is described below with reference to FIG. 6 and FIG. 11 to FIG. 14B.

Figure 6:
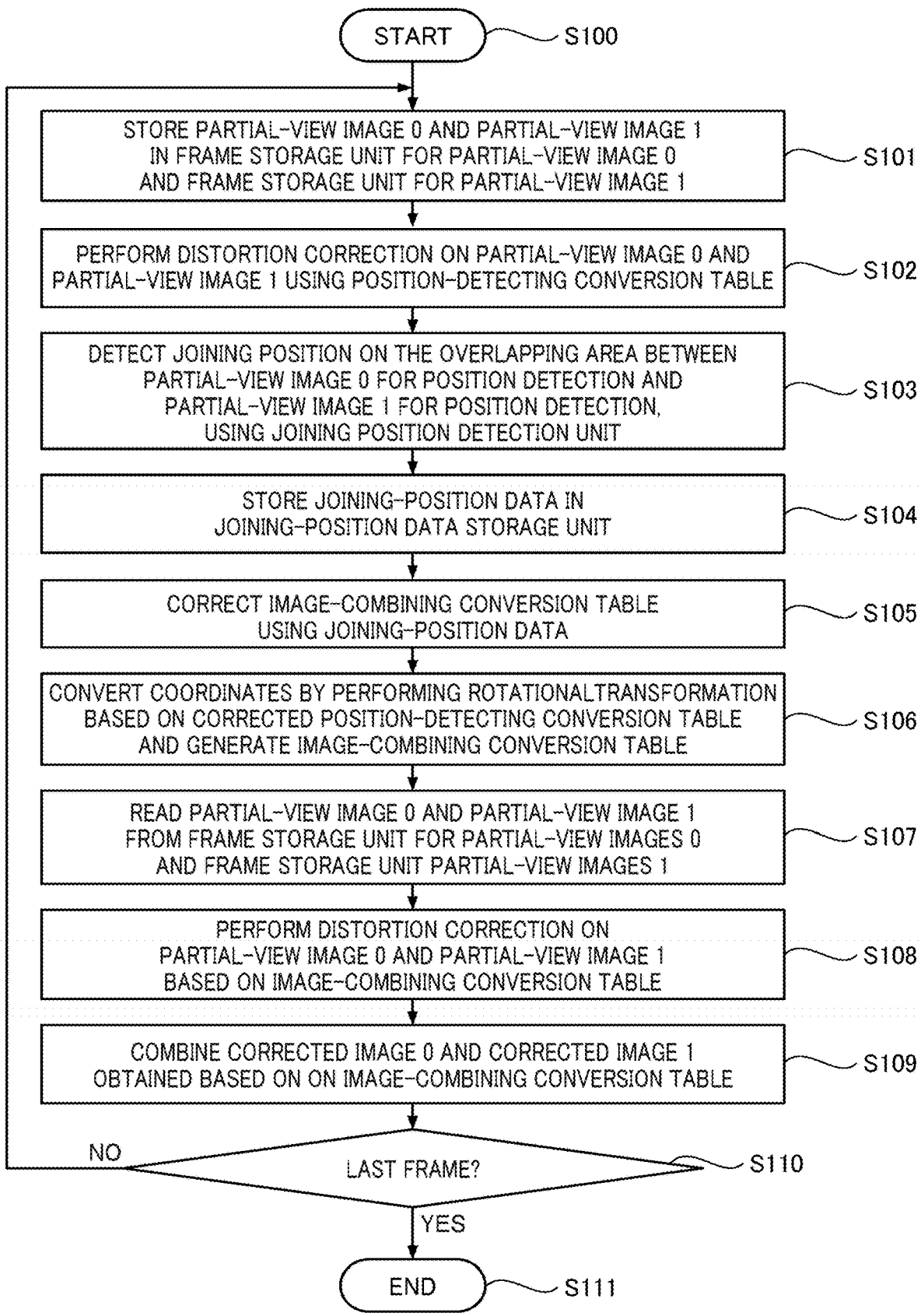
FIG. 6 is a flowchart of the overall omnidirectional image and video generating processes performed by an omnidirectional imaging device, according to embodiments of the present disclosure.

FIG. 6 is a flowchart of the overall omnidirectional image and video generating processes performed by the omnidirectional imaging device 10, according to the present embodiment.

The processes that are depicted in FIG. 6 start from a step S100, for example, when the operation key 18 of the omnidirectional imaging device 10 is pressed down or when commands for capturing images or recording video data are sent from the CPU 130 in response to instructions sent from an application installed in an external device through the network.

In a step S101, the omnidirectional imaging device 10 stores the input image data of the partial-view image 0 and the partial-view image 1 in the frame storage unit 202a for the partial-view image 0 and the frame storage unit 202b for the partial-view image 1.

In a step S102, the position-detecting distortion correction unit 204 of the omnidirectional imaging device 10 uses the position-detecting conversion table 230 to perform distortion correction on the partial-view image 0 and the partial-view image 1 obtained by the pair of solid-state image sensing devices 22A and 22B. As a result, as illustrated in FIG. 10, the corrected image for position detection 0 and corrected image for position detection 1 in an omnidirectional image format can be obtained.

In a step S103, the omnidirectional imaging device 10 uses the joining-position detection unit 206 to detect joining position on the overlapping area between partial-view image 0 for position detection and partial-view image 1 for position detection and generate joining-position data. In the present embodiment as will be described below, template matching is performed, and the joining-position data is calculated and obtained as the amount of shifting from the reference position. Note that the joining-position data indicates how much a position where the value of the matching score is maximized between a template image extracted from one or more images on one hand and an image of a corresponding search area on the other hand is shifted from the reference position.

Figure 11:
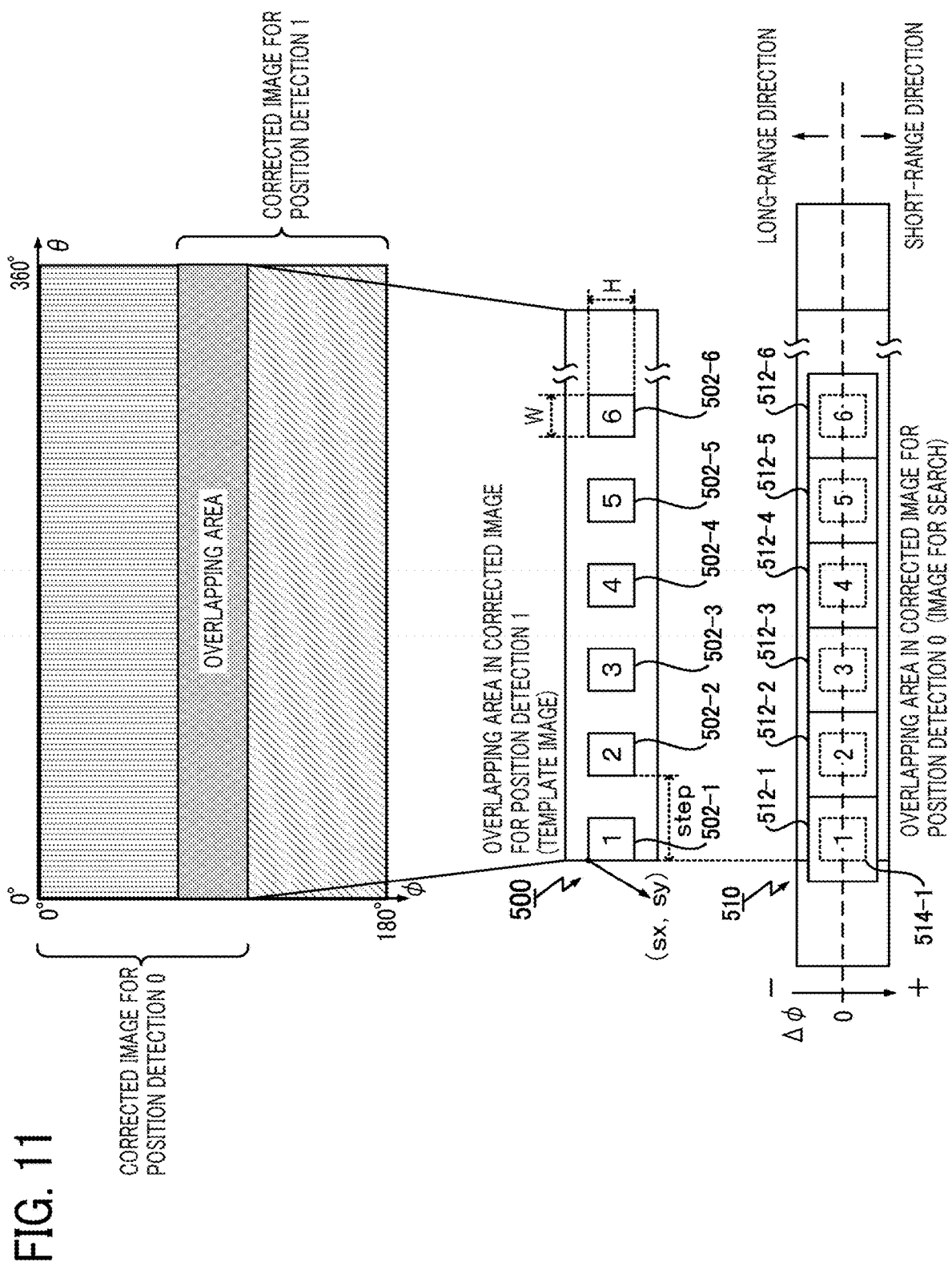
FIG. 11 is a diagram illustrating a method of generating a template image and an image for search in joining-position detection processes, according to embodiments of the present disclosure.

FIG. 11 is a diagram illustrating a method of generating a template image and an image for search in the joining-position detection processes, according to the present embodiment.

In the present embodiment as will be described below, a template image 500 corresponds to an image over the overlapping area of the corrected image for position detection 1, and an image for search 510 corresponds to an image over the overlapping area of the corrected image for position detection 0. In the present embodiment, a certain size of the blocks that is the size of the pixels of a template image is specified, and certain intervals at which neighboring template images are generated are specified. Moreover, the coordinates at which the first template image is extracted, i.e., the coordinates of the point where the generation of blocks starts, are determined. The size of the blocks and the intervals at which the blocks are generated may be determined in view of the desired precision of the joining process and the desired processing speed of the joining process.

When it is assumed that the size of the blocks W×H pixels, the coordinates of the point where the generation of blocks starts are (sx, sy), and that the intervals at which the blocks are generated are at the length of pixels indicated by "step," a plurality of template images 502-1 to 502-# are generated as in the example illustrated in FIG. 11. In the present embodiment as will be described below, the number of blocks # of the generated template images is an integral number of the value obtained by dividing the width size of the template image 500 in the horizontal direction (i.e., the width size in an omnidirectional image format=3600 pixels) by the generation intervals (steps).

For each of the multiple template images 502-1 to 502-# generated in the present embodiment, a predetermined search area 512 is searched for corresponding portions 514 on the image for search 510.

As an example of template matching, the zero-mean normalized cross-correlation (ZNCC) and the zero-mean sum of squared differences (ZSSD) are described below with reference to FIG. 12A and FIG. 12B.

Figure 12A:
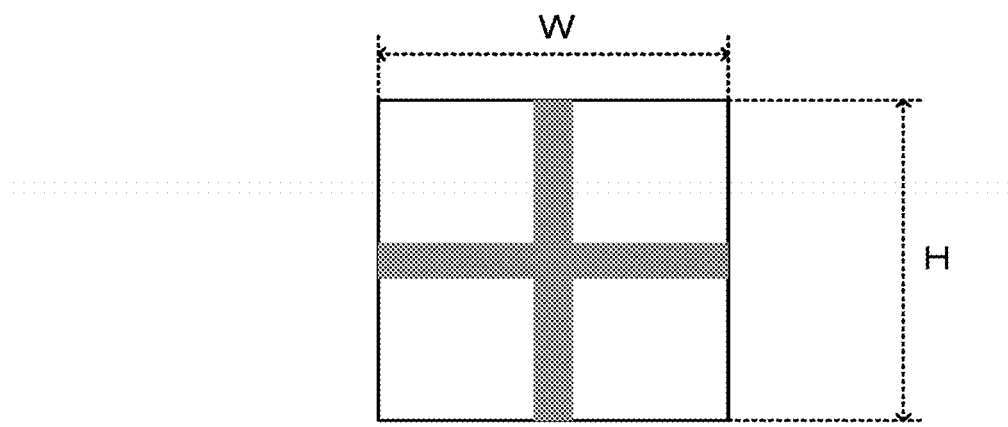
FIG. 12A is a diagram illustrating a template image according to embodiments of the present disclosure.

FIG. 12A is a diagram illustrating a template image according to the present embodiment.

Figure 12B:
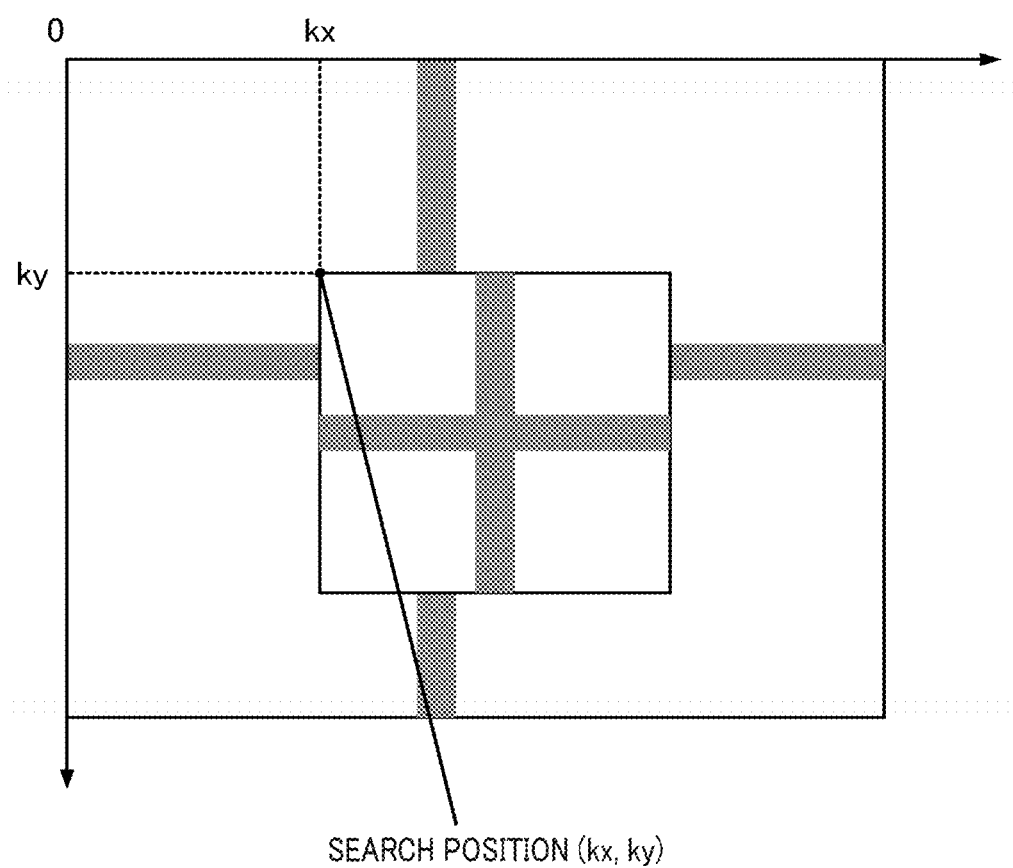
FIG. 12B is a diagram illustrating the processes of searching for a template image on a search area, using the pattern matching method, according to embodiments of the present disclosure.

FIG. 12B is a diagram illustrating the processes of searching for a template image on a search area, using, for example, the pattern matching method, according to the present embodiment.

In the present embodiment, it is assumed that "W pixels×H pixels" indicate the number of all the pixels on a template image (N), and (kx, ky) indicates the search position in the search area. When it is assumed that the search position (kx, ky) is the reference coordinates (0, 0), the brightness value of the template image at the coordinates (i, j) is T(i, j), and that the brightness value of the image for search at the coordinates (i, j) is S(ky+i, ky+j), a matching score ZNCC (kx, ky) obtained by the ZNCC can be calculated by the first equation given below. In FIG. 12A and FIG. 12B, the search position (kx, ky) is set at a position on the upper-left side of the template image. However, how the coordinates of the search position are set is not limited to any particular way. In an alternative embodiment, the search position (kx, ky) may be set at the center of the template image.

$$ZNCC(kx, ky) = \frac{N \sum_{j=0}^{k-1} \sum_{i=0}^{w-1} S(kx+i, ky+j) T(i,j) - \sum_{j=0}^{k-1} \sum_{i=0}^{w-1} S(kx+i, ky+j) \times \sum_{j=0}^{k-1} \sum_{i=0}^{w-1} T(i,j)}{\sqrt{\left(N \sum_{j=0}^{k-1} \sum_{i=0}^{w-1} \{S(kx+i, ky+j)\}^2 - \left\{\sum_{j=0}^{k-1} \sum_{i=0}^{w-1} S(kx+i, ky+j)\right\}^2\right) \times \left(N \sum_{j=0}^{k-1} \sum_{i=0}^{w-1} \{T(i,j)\}^2 - \left\{\sum_{j=0}^{k-1} \sum_{i=0}^{w-1} T(i,j)\right\}^2\right)}}$$ First Equation The matching score ZNCC (kx, ky) indicates the degree of similarity, and 1 indicates the complete match and −1 indicates the reversal. In other words, the greater value of the matching score ZNCC (kx, ky) indicates the higher degree of similarity to the template image. As illustrated in FIG. 12B, template matching is performed while shifting the position of the template image vertically and horizontally within the search area, and a matching score ZNCC (kx, ky) is calculated for each one of the search positions.

By contrast, the degree of dissimilarity ZSSD (kx, ky), which is obtained using the zero-mean sum of squared differences (ZSSD), can be calculated by the second equation given below. When the ZSSD is used, the sum of squared difference (SSD) of the difference between the brightness values of a pair of pixels at the same position is calculated and obtained. Accordingly, the value of ZSSD indicates a so-called degree of dissimilarity, and a larger value of the ZSSD indicates a smaller degree of similarity. For this reason, the value of ZSSD is negatively entered such that the score indicates the degree of similarity. In other words, −ZSSD (kx, ky) is used as a matching score.

$$ZSSD(kx, ky) = \frac{\sum_{j=0}^{h-1} \sum_{i=0}^{w-1} \{S(kx+i, ky+j)\}^2}{N} - \frac{\left\{\sum_{j=0}^{h-1} \sum_{i=0}^{w-1} S(kx+i, ky+j)\right\}^2}{N^2} + \frac{\sum_{j=0}^{h-1} \sum_{i=0}^{w-1} \{T(i,j)\}^2}{N} - \frac{\left\{\sum_{j=0}^{h-1} \sum_{i=0}^{w-1} T(i,j)\right\}^2}{N^2} - 2\left[\frac{\sum_{j=0}^{h-1} \sum_{i=0}^{w-1} S(kx+i, ky+j) T(i,j)}{N} - \frac{\sum_{j=0}^{h-1} \sum_{i=0}^{w-1} S(kx+i, ky+j) \times \sum_{j=0}^{h-1} \sum_{i=0}^{w-1} T(i,j)}{N^2}\right]$$ Second Equation Assuming that value of each pixel is 8 bit, the matching score ZSSD (kx, ky) ranges between −(255×255) and 0, and 0 indicates the complete match. The greater value of the matching score ZSSD (kx, ky) indicates the higher degree of similarity to the template image.

The ZNCC as described above can absorb the variations in image gain, and is preferable as it can absorb the variations in average luminous intensity of image and has high robustness in matching of degree of similarity. In particular, the ZNCC can preferably be used when the brightness of an image distributes sufficiently widely and a large amounts of characteristics are observed on an image. By contrast, the ZSSD has an advantage over the sum of squared difference (SSD) as the ZSSD can absorb the variations in average luminous intensity of image. Although the computation cost of the ZSSD is higher than that of the SSD, the ZSSD provides more simple computation than the ZNCC. In particular, the ZSSD can preferably be used for a blurred image with little characteristics or features. As an alternative to the ZSSD, the zero-mean sum of absolute differences (ZSAD) may be adopted.

Note also that both ends of the omnidirectional image format in the 0 coordinate (0 degree and 360 degrees) are to be combined. Accordingly, when template images are generated or template matching is performed, the next to the right end can be handled as the left end, and the next to the left end can be handled as the right end. In the above step S103, the amount of the shifting from a reference position at a position where the matching score becomes maximum is detected for each of the template images 502-1 to 502-#.

When it is assumed in FIG. 11 that a template image 500 is generated based on the corrected image for position detection 1 and an image for search 510 is generated based on the corrected image for position detection 0, the direction in which the template image 500 is searched for on the image for search 510 toward 0-degree side by $\varphi$ corresponds to a long-range direction in which the distance between the omnidirectional imaging device 10 and the object increases. On the contrary, when it is assumed in FIG. 11 that the template image 500 is generated based on the corrected image for position detection 0 and the image for search 510 is generated based on the corrected image for position detection 1, the direction in which the template image 500 is searched for on the image for search 510 toward 180-degree side by $\varphi$ corresponds to a short-range direction in which the distance between the omnidirectional imaging device 10 and the object decreases. "$\Delta\varphi=0$" as depicted in FIG. 11 indicates the uncorrected joining position set in the position-detecting conversion table 230.

In a step S104, the joining-position data storage unit 210 of the omnidirectional imaging device 10 stores the joining-position data for each of the detected multiple template images (portions). In a step S105, the table correction unit 212 of the omnidirectional imaging device 10 corrects the position-detecting conversion table 230 based on the joining-position data of each one of the multiple template images.

FIG. 13 is a diagram illustrating an example data structure of a joining-position table generated to correct the position-detecting conversion table 230, where the joining-position table includes the joining position of each one of the pixels, according to the present embodiment.

In the present embodiment, as illustrated in FIG. 13, a table in which the post-conversion coordinate values ($\theta$, $\varphi$) associated with the amounts of shifting ($\Delta\theta$, $\Delta\varphi$) are listed for all the coordinate values is generated based on the joining-position data of each template image. In so doing, the amount of displacement ($\Delta\theta i$, $\Delta\varphi i$) for each one of a plurality of template blocks (sites) i, which is calculated in the joining position detection and correction processes as described above, is set as the values of the center coordinates of the template block, and the amount of displacement ($\Delta\theta$, $\Delta\varphi$) that corresponds to each of the coordinate values ($\theta$, $\varphi$) is interpolated. As a result, a joining position can be calculated and obtained. In the embodiments of the present disclosure as described below, the joining position of each one of the pixels is stored in a table format. However, no limitation is indicated thereby.

Figure 14B:
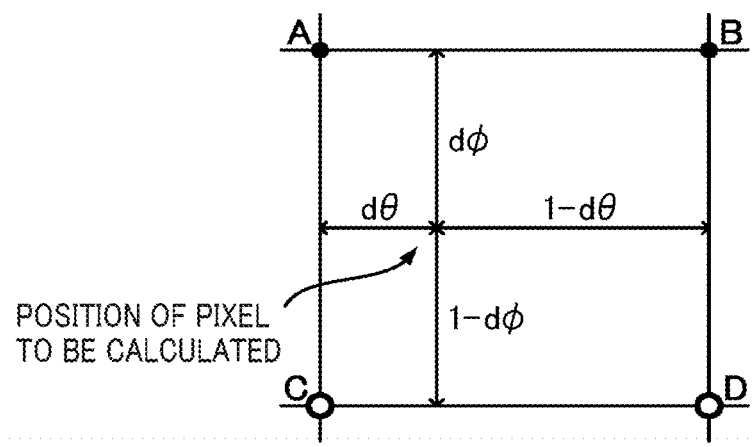

More specifically, firstly, as illustrated in FIG. 14A, the amount of shifting ($\Delta\theta$, $\Delta\varphi$), where $\theta$ is equal to the values of the center coordinates of each one of the above multiple template blocks, at the coordinates of the top end ($\varphi=0$) and the bottom end ($\varphi=3599$ when the width is equivalent to 3600 pixels) is set as (0, 0) in addition to the amount of shifting ($\Delta\theta i$, $\Delta\varphi i$) that corresponds to each one of the above multiple template blocks. Regarding other coordinates to which no amount of shifting has been set, as illustrated in FIG. 14B, a grid whose corners are the four neighboring points that have already been set as above, i.e., A to D in FIG. 14B, is assumed, and the amount of shifting within that grid is calculated based on the two-dimensional linear interpolation.

In the embodiments of the present disclosure as described below, the amount of shifting (0, 0) is set for the top end ($\varphi=0$) and the bottom end ($\varphi=3599$) in the omnidirectional image format. However, no limitation is indicated thereby, and the above two-dimensional linear interpolation may be performed upon setting the coordinates that are used as the amount of shifting (0, 0) inwardly where $\varphi>0$ and $\varphi<3599$. In such a configuration, the amount of shifting (0, 0) may be set for all the coordinates that are further in the $\varphi$-direction than the inwardly-set coordinates.

In a step S106 as depicted in FIG. 6, the table generation unit 214 of the omnidirectional imaging device 10 converts the coordinates by performing rotational transformation based on the corrected position-detecting conversion table 230. As a result, the image-combining conversion table 232 is generated. In a step S107, the omnidirectional imaging device 10 reads partial-view image 0 and partial-view image 1 from the frame storage unit 202a and the frame storage unit 202b. In a step S108, the omnidirectional imaging device 10 performs distortion correction on the partial-view image 0 and partial-view image 1 based on the joining-position data and the corrected and generated image-combining conversion table 232, to generate a corrected image for image combination 0 and a corrected image for image combination 1.

As a result of the process performed by the image-combining distortion correction unit 216, as illustrated in FIG. 15, the two partial-view images 0 and 1 that are captured by the fish-eye lenses are developed in an omnidirectional image format. As the image-combining conversion table 232 is generated based on the joining-position data, the corrected image for image combination 0 and the corrected image for image combination 1 already reflects the correction of the joining position at this stage, and can be overlaid on top of each other as they are. In a step S109, the omnidirectional imaging device 10 uses the composite image generator 218 to generate a corrected image for image combination 0 and a corrected image for image combination 1.

In a step S110, the omnidirectional imaging device 10 determines whether the received frame is the last frame. When it is determined in the step S110 that the frame is not the last frame (NO), the image-combining process continues and returns to the step S101. By contrast, when it is determined in the step S110 that a frame is not going to be input any further and the frame is the last frame (YES), the process is branched into a step S111, and the composite-image generating process in the present embodiment is terminated.

The series of composite images that are made of a plurality of composite frames on the spherical image, which are generated by the processes in the steps as illustrated in FIG. 6, are sequentially output to the image compression unit 222. Then, video compression is performed by the image compression unit 222 on the series of composite images, and the obtained series of composite images is written out as the image data 240 of video data.

Embodiments of the present disclosure with the use of the omnidirectional imaging device 10 and the information terminal 170 as described above are described below in a more specific manner. In the embodiments of the present disclosure as described below, a video-conference system in which a plurality of participants at a plurality of sites such as a plurality of conference rooms join and conduct a video conference through the network is described as an example. However, no limitation is intended thereby. For example, a video call system may be adopted in which a plurality of participants at a plurality of sites communicate with each other using only the video data and the audio data.

Figure 16:
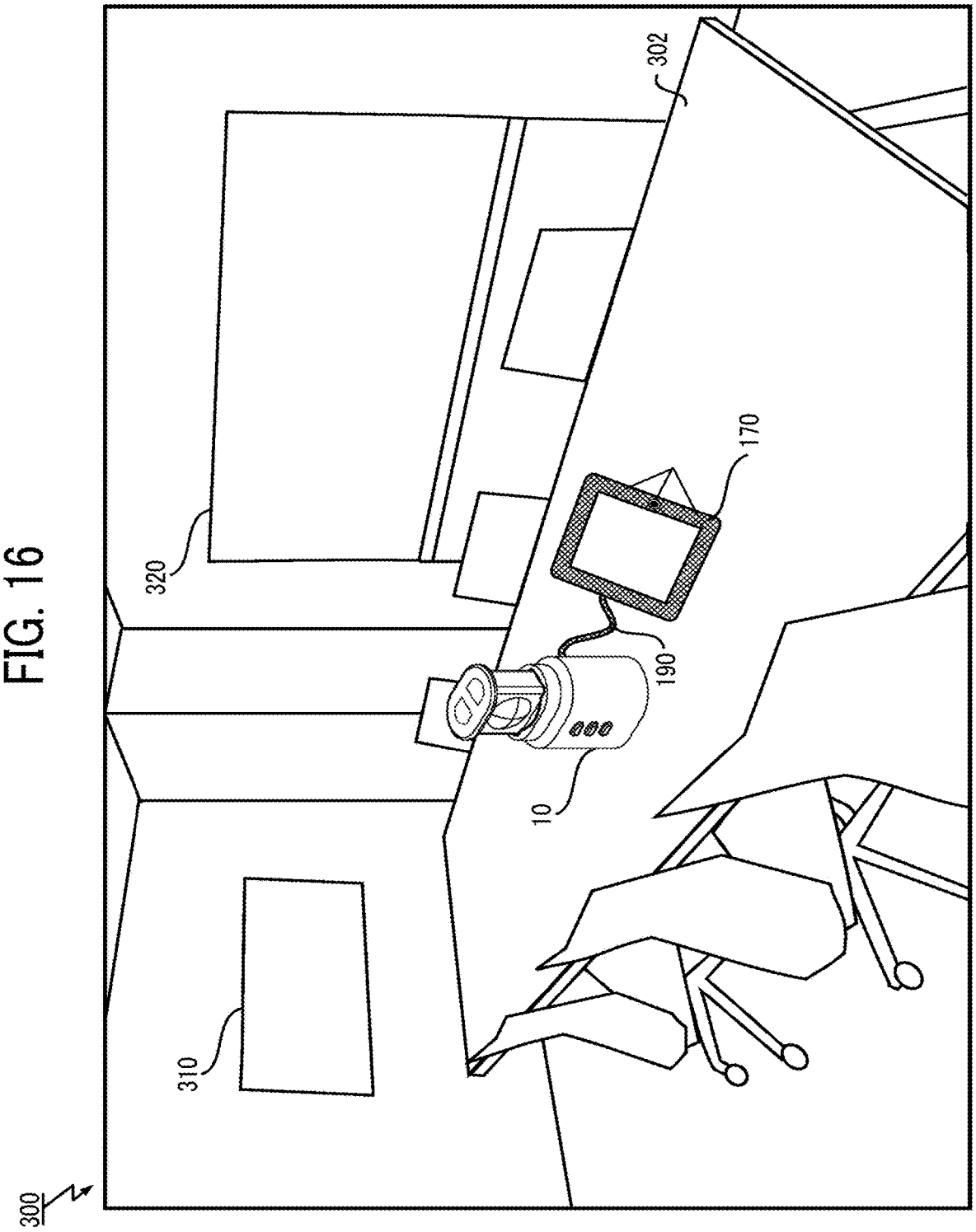
FIG. 16 is a schematic diagram of a video-conference system configured by elements such as an omnidirectional imaging device and an information terminal, according to embodiments of the present disclosure.

FIG. 16 is a schematic diagram of a video-conference system configured by elements such as the omnidirectional imaging device 10 and the information terminal 170, according to the present embodiment. The omnidirectional imaging device 10 and the information terminal 170 are installed on the table 302 in the conference room 300 that serves as the equipped space in the present embodiment, and are coupled to each other through the USB cable 190.

The information terminal 170 that is illustrated in FIG. 16 is installed with a video-conference assistance application. Such a video-conference assistance application is software that enables the data exchange of the video data or audio data of a conference and the sharing of information, such as the reference material that is to be used in the conference, in real time among a plurality of sites including a remote site. The information terminal 170 that is installed with such a video-conference assistance application serves as the controller of the omnidirectional imaging device 10. For example, the information terminal 170 that is installed with such a video-conference assistance application controls the omnidirectional imaging device 10 to start or terminate the operation. Moreover, the information terminal 170 that is installed with such a video-conference assistance application serves as the receiver of the video signal sent from the omnidirectional imaging device 10, and serves as the controller that controls the connection to the network server. Further, the information terminal 170 that is installed with such a video-conference assistance application serves as the distribution unit that controls the distribution of the video signal to the network server.

As preparations for starting a video conference, the operation key 18 is pressed down to start the omnidirectional imaging device 10. Then, a video-conference assistance application is started on the information terminal 170, and the connection setup between the omnidirectional imaging device 10 and the information terminal 170 is adjusted on the video-conference assistance application. When the video conference is to be started, the operation of starting a conference is executed through the video-conference assistance application of the information terminal 170.

Once the video-conference assistance application accepts the operation of starting a conference, the information terminal 170 is connected to the network server, and starts the distribution of the video signal that includes the spherical video data and the audio data of the conference room received from the omnidirectional imaging device 10. Once the operation of sharing the reference material is conducted on a video-conference assistance application, the sharing of the reference-material data or the like to be used in the conference that is being conducted through the network server or the information terminal 170 is enabled.

Note also that the multiple sites are not limited to a plurality of conference rooms. Through the use of a personal computer (PC) or a mobile information terminal such as a smartphone and a video-conference assistance application that is executed on the mobile information terminal, anybody can join the conference at any desired site as long as the sufficient network environment is available. Due to such a configuration, the participants at the multiple sites can access and obtain the video data viewed in any desired direction inside the conference room, and a plurality of conference participants in the conference room can view the information that is displayed on, for example, the interactive board 310 and the white board 320.

Moreover, in the present embodiment, the video signal such as the video data and the audio data can be distributed from a plurality of sites, and for example, if the omnidirectional imaging device 10 and the information terminal 170 are used at each of the multiple sites, the state of the conference room on the other end can mutually be observed through the spherical video data.

In the embodiments of the present disclosure as described below, it is assumed that spherical images are used. However, no limitation is intended to spherical images when the embodiments of the present application are applied to, for example, the conference assistance or video call, and 360-degree panoramic images that include horizontally 360-degree images and vertically 180-or-less-degree images may be adopted.

Figure 17:
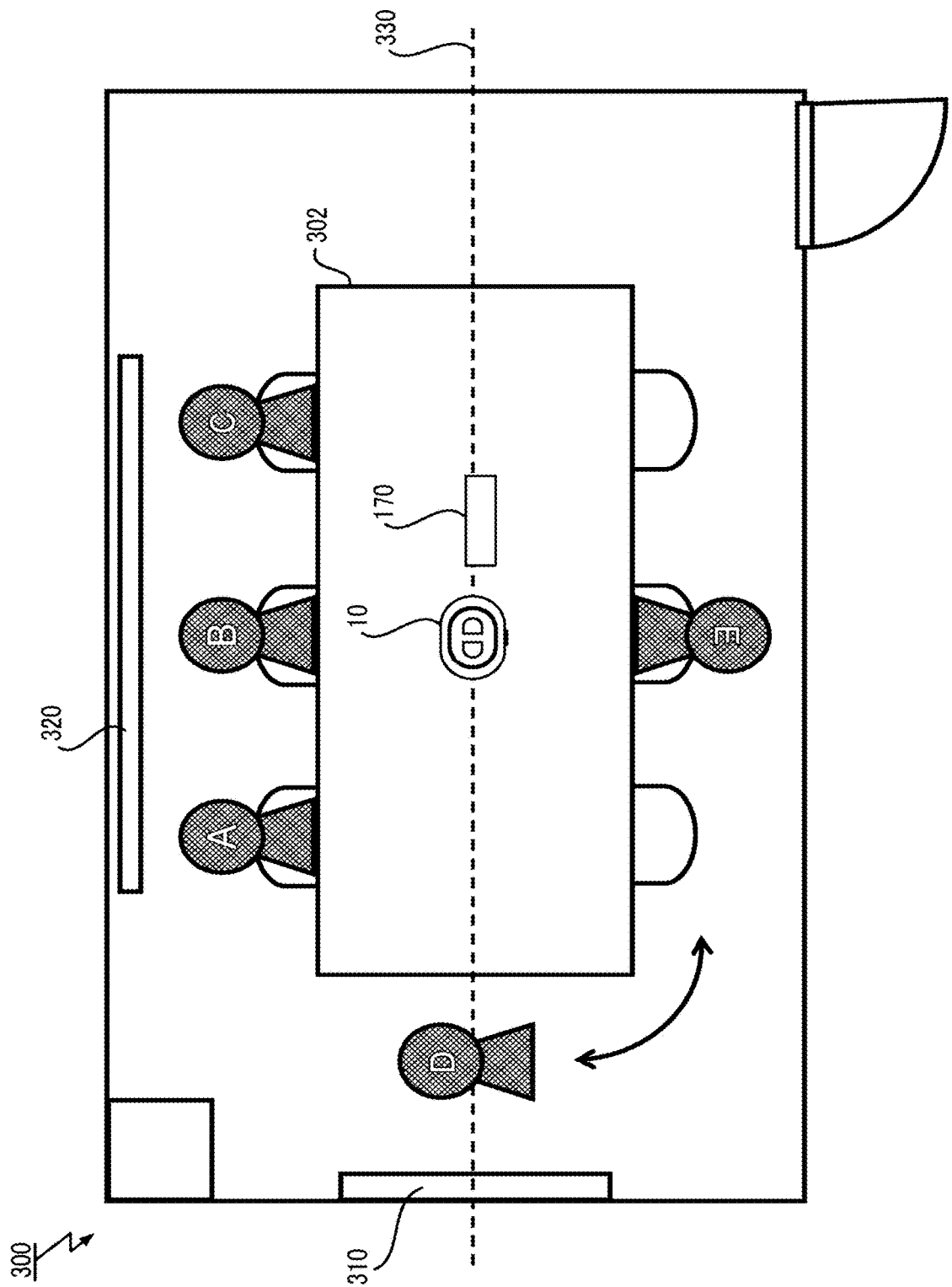
FIG. 17 is a diagram illustrating an example environment where an omnidirectional imaging device is installed in a conference room, according to an embodiment of the present disclosure.

FIG. 17 is a diagram illustrating an example environment where the omnidirectional imaging device 10 is installed in a conference room 300, according to the present embodiment.

In the present embodiment, it is assumed that the conference room 300 is provided with an interactive board 310 and a white board 320. The white board 320 is used to write or draw a character or figure by hand with a pen or stylus for whiteboard, such that a meeting is run in an efficient manner. The interactive board 310 is a device that may display the video data sent from a terminal such as a personal computer (PC) of a conference participant, or may be used to write or draw on its screen a character or figure by hand with a pen or specialized stylus in a similar manner to white boards.

As described above, the omnidirectional imaging device 10 uses the pair of image forming optical systems 20A and 20B. Due to such a configuration, a joining boundary appears in the video data that is recorded by the omnidirectional imaging device 10 when the pair of partial-view images obtained from the pair of imaging optical systems are joined or combined. In FIG. 17, the portion that corresponds to the joining boundary 330 in the spherical image that is captured by the omnidirectional imaging device 10 is directed to the interactive board 310 installed in the conference room. For example, the reference materials for the conference may be displayed on the interactive board 310, and in some cases, some characters or drawings may be written by hand on the reference material that is being displayed on the interactive board 310. As indicated by an arc-shaped arrow in FIG. 17, for example, the participant D may be seated, or the participant D may move to a position in front of the interactive board 310 and explain the reference materials for the conference. In such cases, the participant D may be included or may not be included on the joining boundary 330 of the spherical image, which is undesirable.

Figure 18A:
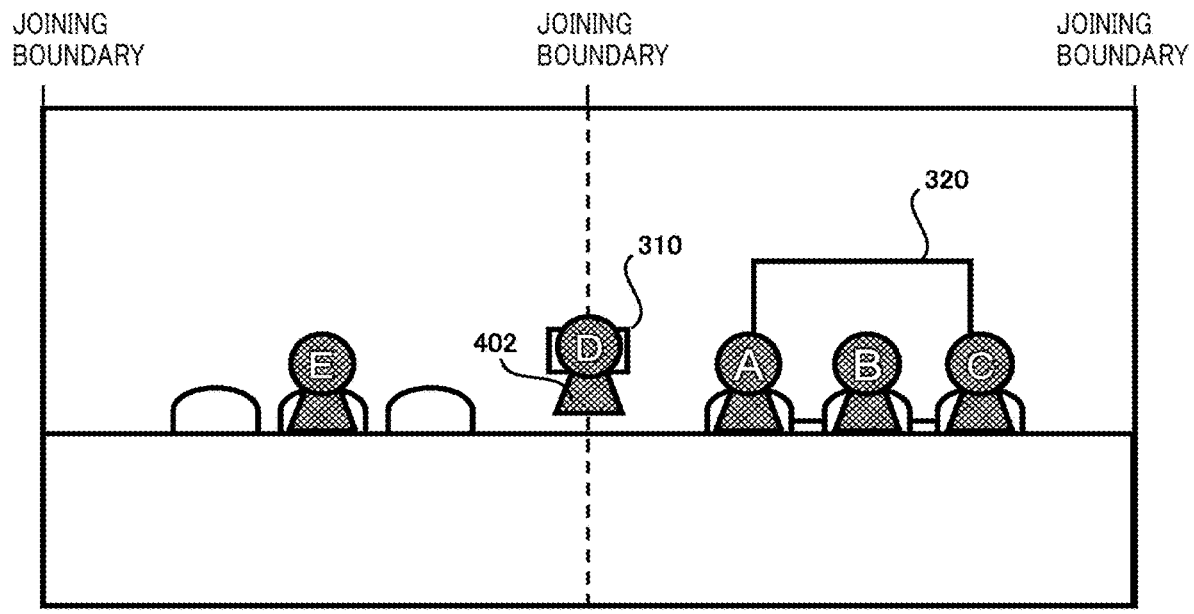
FIG. 18A and FIG. 18B are diagrams each illustrating a picture in an omnidirectional image format that is distributed to the network server in a video-conference system, according to embodiments of the present disclosure.
Figure 18B:
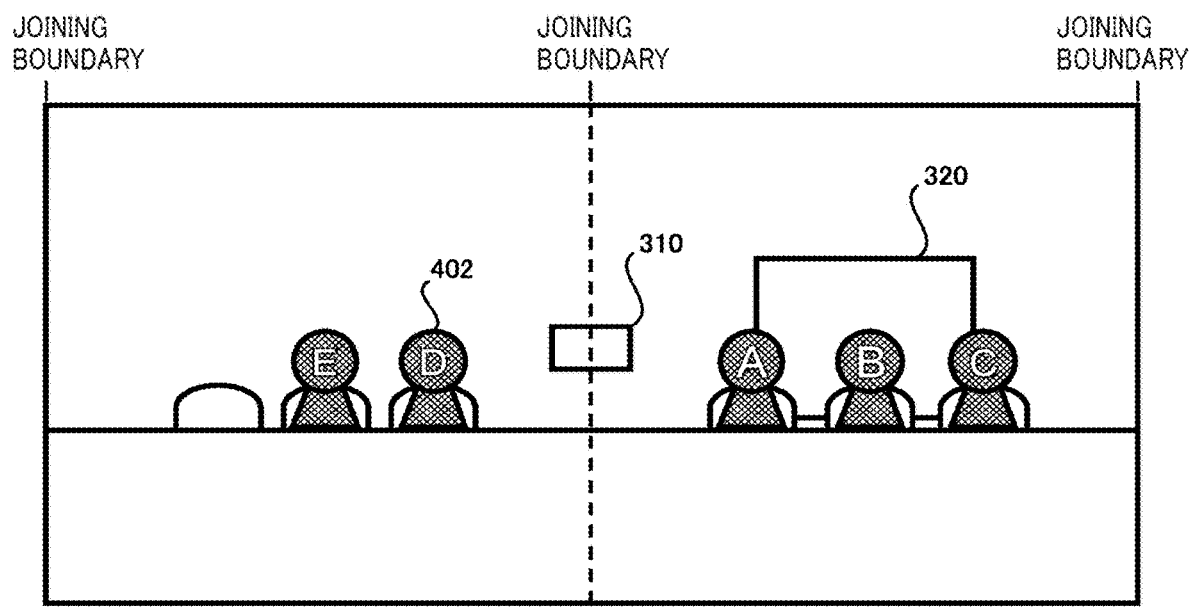

FIG. 18A and FIG. 18B are diagrams each illustrating a picture in an omnidirectional image format that is distributed to the network server in a video-conference system, according to the present embodiment.

More specifically, FIG. 18A illustrates a situation in which a participant D402 moves to a position in front of the interactive board 310 and the interactive board 310 is hidden by the participant D402 and invisible, and FIG. 18B illustrates a situation in which the participant D402 is seated and the interactive board 310 is not hidden and visible.

As the participant D402 moves, the distance between the omnidirectional imaging device 10 and the object changes. For this reason, it is desired that the omnidirectional imaging device 10 change the joining position in an adaptive manner.

In other words, it is desired that the omnidirectional imaging device 10 change the joining position as the distance between the omnidirectional imaging device 10 and the object changes.

In order to change the joining position in an adaptive manner, it is desired that a joining position be detected at each position on a frame-by-frame basis. When the joining position is changed in an adaptive manner, there is room for improvement in the respect that the discontinuity between a pair of frames tends to stand out and in the respect that the power consumption increases and a more expensive controller is required as the processing load of the joining position detection is relatively heavy.

The discontinuity between a pair of frames, which is as described above in the present embodiment, indicates a phenomenon that the pair of images tends to move at the joining position between a pair of frames in an unnatural way due to frequent changes in joining position and the quality of the video data deteriorates. For example, there are some cases in which the detected joining position varies due to, for example, a slight change in joined or combined portion of the image data such as changes in brightness value due to noise, despite the fact that both the omnidirectional imaging device 10 and the objects under being-recorded environments are almost still and move only slightly while the video data of a conference is being recorded. If the joining position is changed in a frequent manner in response to such changes, such changes tend to appear on the video data as unnatural movement.

In the omnidirectional imaging device 10 according to the present embodiment, the joining-position detection unit 206 as illustrated in FIG. 5 includes an evaluation unit 207 and a detection unit 208. The joining-position detection unit 206 uses the evaluation unit 207 to evaluate the joining positions of each site that are detected in the past and stored in the joining-position data storage unit 210 and make use of such joining positions detected in the past, and uses the detection unit 208 to detect the joining position again on a site that meets a predetermined condition. As described above, the joining-position detection unit 206 according to the present embodiment is configured to detect the joining position dynamically and omit the detection of a joining position where unnecessary.

A method in which a joining position is dynamically detected on a frame-by-frame basis is referred to as a dynamic joining. A method in which a joining position is detected on a site where necessary as described above but the detection of joining position is omitted where unnecessary is referred to as an intermittent joining in the following description. In the present embodiment as will be described below, it is assumed that, basically, the above intermittent joining is performed. However, no limitation is indicated thereby, and any desired one of the dynamic joining, the intermittent joining, and another joining method may be selected and executed as the operation is made on the application or the operation key 18 of the omnidirectional imaging device 10 is pressed down.

The joining-position data storage unit 210 stores a joining position on each one of the multiple portions between the partial-view image 0 and the partial-view image 1 that are input from the joining-position detection unit 206. More preferably, the joining-position data storage unit 210 stores the joining position of each portion in the previous frame. As described above, the joining-position data for each one of the multiple portions is obtained for the joining position between the corrected image for position detection 0 and the corrected image for position detection 1 that are obtained as a result of the conversion performed on the partial-view image 0 and the partial-view image 1. Accordingly, the joining-position data for each one of the multiple portions is recorded as the amount of shifting from the reference position in the relevant coordinate system, for each position of coordinates in the omnidirectional image format.

The evaluation unit 207 evaluates the validity of the joining position in the previous frame stored in the joining-position data storage unit 210 in the current frame for each of the multiple portions. In such evaluation of validity according to the present embodiment, whether joining is possible in the current frame with a desired degree of precision is evaluated based on the joining positions detected in the past. More specifically, the evaluation unit 207 calculates the relevance ratio when the joining position in the previous frame is applied to the image in the current frame as the evaluation values each of which indicates the validity. A matching score that is obtained using the ZNCC or the ZSSD as described above can be used as a measure of the relevance ratio. However, no limitation is indicated thereby. The evaluation unit 207 may serve as an evaluation unit and a computing unit according to the present embodiment. The detection of a joining position is not performed again on a site where the degree of validity meets prescribed criteria, and the previous joining position that is stored in the joining-position data storage unit 210 is used.

The detection unit 208 sets a prescribed search area on a site where the degree of validity does not satisfy prescribed criteria, and detects a joining position between a current pair of images. How a joining position is detected using, for example, the pattern matching is same as above. The detection unit 208 may serve as a detector according to the present embodiment.

The table correction unit 212 uses the previous joining position to correct the position-detecting conversion table 230 for a site where the degree of validity meets prescribed criteria, and uses the newly-detected joining position to correct the position-detecting conversion table 230 for a site where the degree of validity does not meet prescribed criteria. The table generation unit 214 generates an image-combining conversion table 232 according to the post-conversion data corrected by the table correction unit 212. The image-combining distortion correction unit 216 performs distortion correction on the partial-view image 0 and the partial-view image 1 based on image-combining conversion table 232. The composite image generator 218 combines the corrected image for image combination 0 and corrected image for image combination 1 that are obtained as a result of distortion correction. Accordingly, the composite-image generating unit according to the present embodiment performs, based on the previous joining position, a composite-image generating process on a site where the degree of validity meets prescribed criteria.

In an alternative embodiment of the present disclosure, when the degree of validity satisfies prescribed criteria for all the multiple sites, the joining positions at all the cites are not changed from the previous time, and the previous table can be used just as it is. In such a configuration, the update of the conversion table as described above, which includes the correction and generation of the conversion table, is omitted. On the other hand, when the joining position is changed at one or more portions of the above multiple portions, the conversion table is updated or regenerated. In the embodiments of the present disclosure as described below, it is assumed that the entirety of the conversion table is updated when the joining position was changed at one or more portions of the above multiple portions. However, no limitation is intended thereby.

In an embodiment of the present disclosure where the conversion table can partially be updated for each block or portion or for each group of blocks or portions, update may be performed on a block-by-block basis, where the degree of validity does not satisfy prescribed criteria at some of the blocks or portions. However, no limitation is indicated thereby, and the load of computation of the conversion-table generating process is not high compared with the load of computation of the joining-position detecting process using, for example, the pattern matching method. For this reason, even if the entirety of the conversion table is uniformly updated when the joining position is changed at one or more portions of the above multiple portions, such an update does not cause an extra load.

The omnidirectional image and video generating processes in which the intermittent joining is adopted, according to the present embodiment, are described below in detail with reference to FIG. 19 to FIG. 22.

Figure 19:
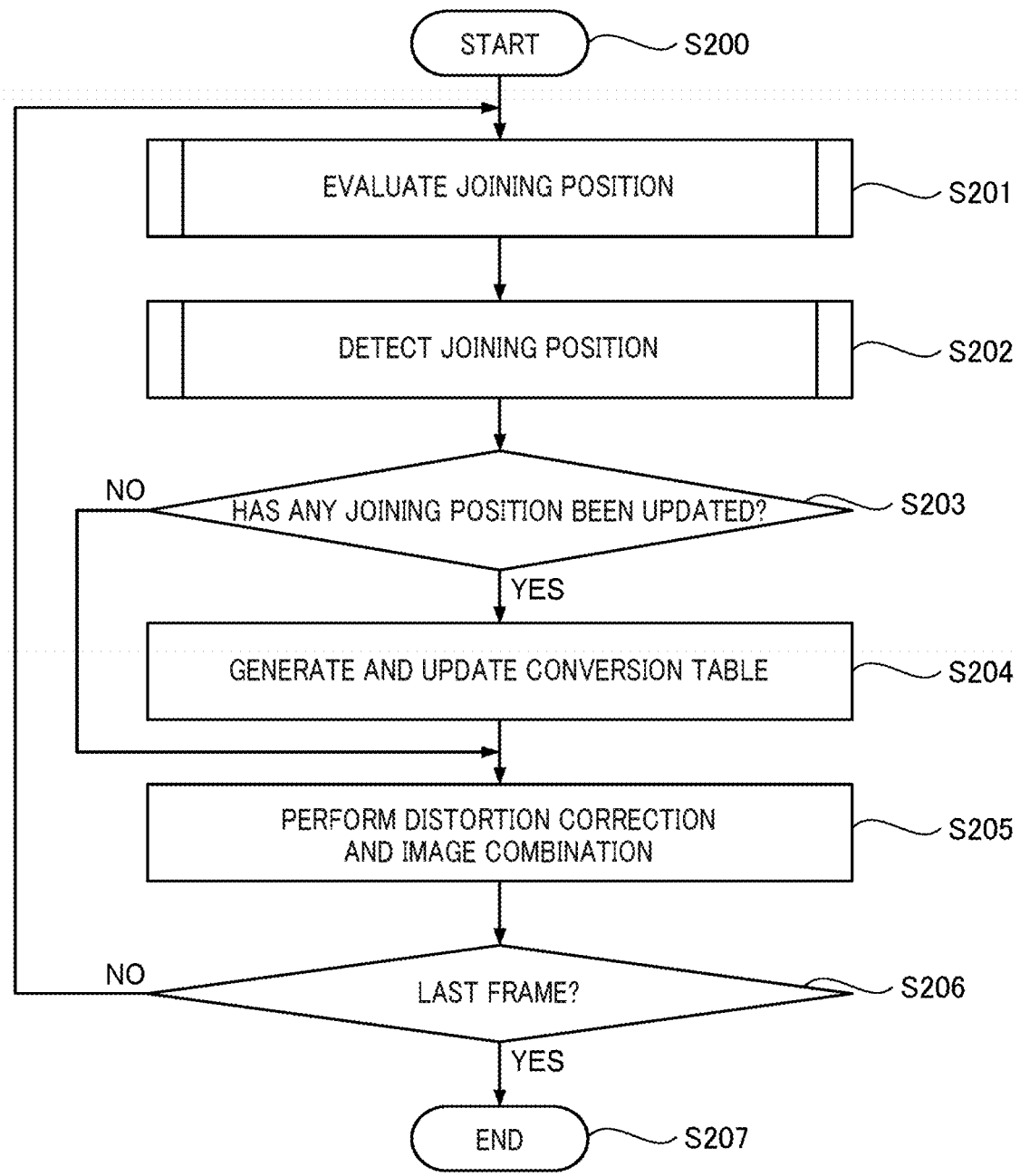
FIG. 19 is a flowchart of main omnidirectional image and video generating processes performed by an omnidirectional imaging device, according to one or a plurality of embodiments of the present disclosure.

FIG. 19 is a flowchart of main omnidirectional image and video generating processes performed by the omnidirectional imaging device 10, according to the present embodiment.

The processes that are depicted in FIG. 19 start from a step S200 in response to, for example, the commands for starting the distribution sent from the video-conference assistance application.

In a step S201, the evaluation unit 207 of the omnidirectional imaging device 10 evaluates the joining positions that are detected in the past and stored.

Figure 20:
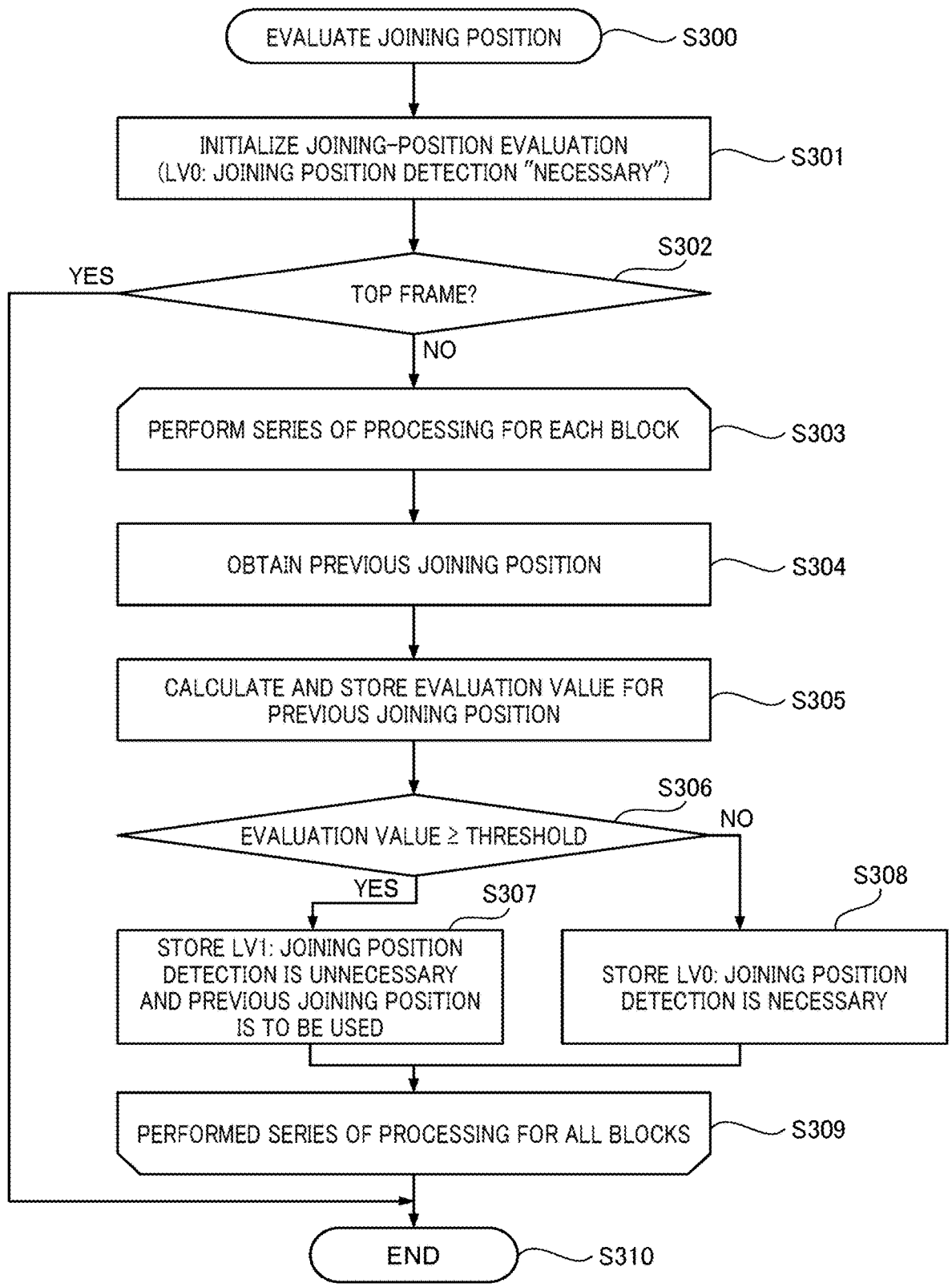
FIG. 20 is a flowchart of the joining-position evaluation processes performed by an omnidirectional imaging device, according to embodiments of the present disclosure.

FIG. 20 is a flowchart of the joining-position evaluation processes performed by the omnidirectional imaging device 10, according to the present embodiment.

The processes that are depicted in FIG. 20 are invoked by the processes in the steps S201 as depicted in FIG. 19, and start from a step S300. Note also that the evaluation unit 207 of the omnidirectional imaging device 10 is in charge of the joining-position evaluation processes as illustrated in FIG. 20.

In a step S301, the omnidirectional imaging device 10 initializes the joining-position evaluation processes. In the joining-position evaluation processes, the result of determination as to whether or not a joining position is to be detected for each site (LV0: joining position detection is necessary) (LV1: joining position detection is unnecessary) is stored. When the joining-position evaluation is to be initialized, it is determined in the joining-position evaluation processes that a joining position is to be detected for all the sites (LV0: joining position detection is necessary).

In a step S302, the omnidirectional imaging device 10 makes the process branched into two paths depending on whether the current frame is the top frame. When it is determined in the step S302 that the current frame is the top frame (YES), the value of the joining-position evaluation remains unchanged from the initial value, and in the step S310, the joining-position evaluation process in the present embodiment is terminated.

On the other hand, when it is determined in the step S302 that the current frame is not the top frame (NO), the process proceeds to a step S303. The loop of processes in the steps S303 to S309 is performed for each block (i).

In a step S304, the omnidirectional imaging device 10 obtains, from the joining-position data storage unit 210, the previous joining position for the relevant block (i). In a step S305, the omnidirectional imaging device 10 calculates the evaluation value (e.g., matching score) of the current frame with reference to the previous joining position for the relevant block (i), and stores the obtained evaluation value in the joining-position data storage unit 210. In a step S306, the omnidirectional imaging device 10 determines whether or not the evaluation value calculated for the relevant block (i) is equal to or greater than a threshold that is provided as a reference value.

As described above, the matching score indicates the degree of similarity, and a larger value of the matching score indicates a higher degree of similarity. In other words, a larger value of the matching score indicates a greater degree of precision in the alignment. Accordingly, in the present embodiment, whether or not the obtained evaluation value is equal to or greater than a threshold is determined. However, no limitation is indicated thereby, and when the obtained evaluation value indicates the degree of dissimilarity and a smaller value indicates a higher degree of similarity, whether or not the obtained evaluation value is equal to or smaller than a threshold may be determined. A predetermined value may be used as a threshold that serves as a value to be compared with. Alternatively, a value that is obtained by subtracting a prescribed margin from the matching score, which is obtained as a result of detection or evaluation performed on the joining position in the previous frame, may be used as a threshold that serves as a value to be compared with.

The matching score that indicates the relevance ratio is not limited to the equivalent of what is calculated when a joining position is detected, and a simple evaluation formula where the load of calculation is relatively small, e.g., the sum of or sum of squared difference (SSD) of the differences between pairs of pixel values or brightness values, may be used. In order to reduce the resources, it is desired that, for example, the matching score between the template images 502 (see FIG. 11) in the current frame and the corresponding portions 514 at the previous joining position within the image for search 510, or the sum of or sum of squared difference (SSD) of the differences between pairs of pixel values or brightness values be used. However, no limitation is intended thereby, and in an alternative embodiment of the present disclosure, for example, the template images in the previous frame may be stored, and the sum of the differences between pairs of pixel values on the template image or the sum of the differences between pairs of brightness values on the template image between the current frame and the previous frame, may be used as an evaluation value. As the determination is made based on a reference value or criteria such as a threshold, it can be configured such that no joining position detection is performed when the changes are slight. Due to such a configuration, the discontinuity between a pair of frames can be prevented from appearing.

When it is determined in the Step S306 that the evaluation value is equal to or greater than the threshold (YES), the process branches into a step S307. In a step S307, the omnidirectional imaging device 10 stores a result of evaluation that the joining position detection is unnecessary (LV1: joining position detection is unnecessary) for the block (i). On the other hand, when it is determined in the step S306 that the evaluation value is less than the threshold (NO), the process branches into a step S308. In a step S308, the omnidirectional imaging device 10 stores a result of evaluation that the joining position detection is necessary (LV0: joining position detection is necessary).

Once the processes in the steps S303 to S309 are completed for all the blocks, In the step S310, the joining-position evaluation process in the present embodiment is terminated, and the controlling process returns to the main route of processing as illustrated in FIG. 19.

FIG. 21A and FIG. 21B are diagrams each illustrating an example data structure of the joining-position data stored in the joining-position data storage unit 210, according to the present embodiment.

FIG. 21A is a diagram illustrating a table in which the previous joining positions to be evaluated are recorded, according to the present embodiment.

FIG. 21B is a diagram illustrating a table in which the results of evaluation obtained in the joining-position evaluation processes as depicted in FIG. 20 are recorded on a block-by-block basis, according to the present embodiment.

As illustrated in FIG. 21B, the evaluation values each of which indicates the validity of the previous joining position on a target frame as well as the results of evaluation, which are obtained in the joining-position evaluation processes as depicted in FIG. 20, are recorded in the table on a block-by-block basis.

In the step S202, as illustrated in FIG. 19, the detection unit 208 of the omnidirectional imaging device 10 refers to the table that indicates the result of evaluation as illustrated in FIG. 21B, and detects a joining position on a site where necessary based on the data in the table.

Figure 22:
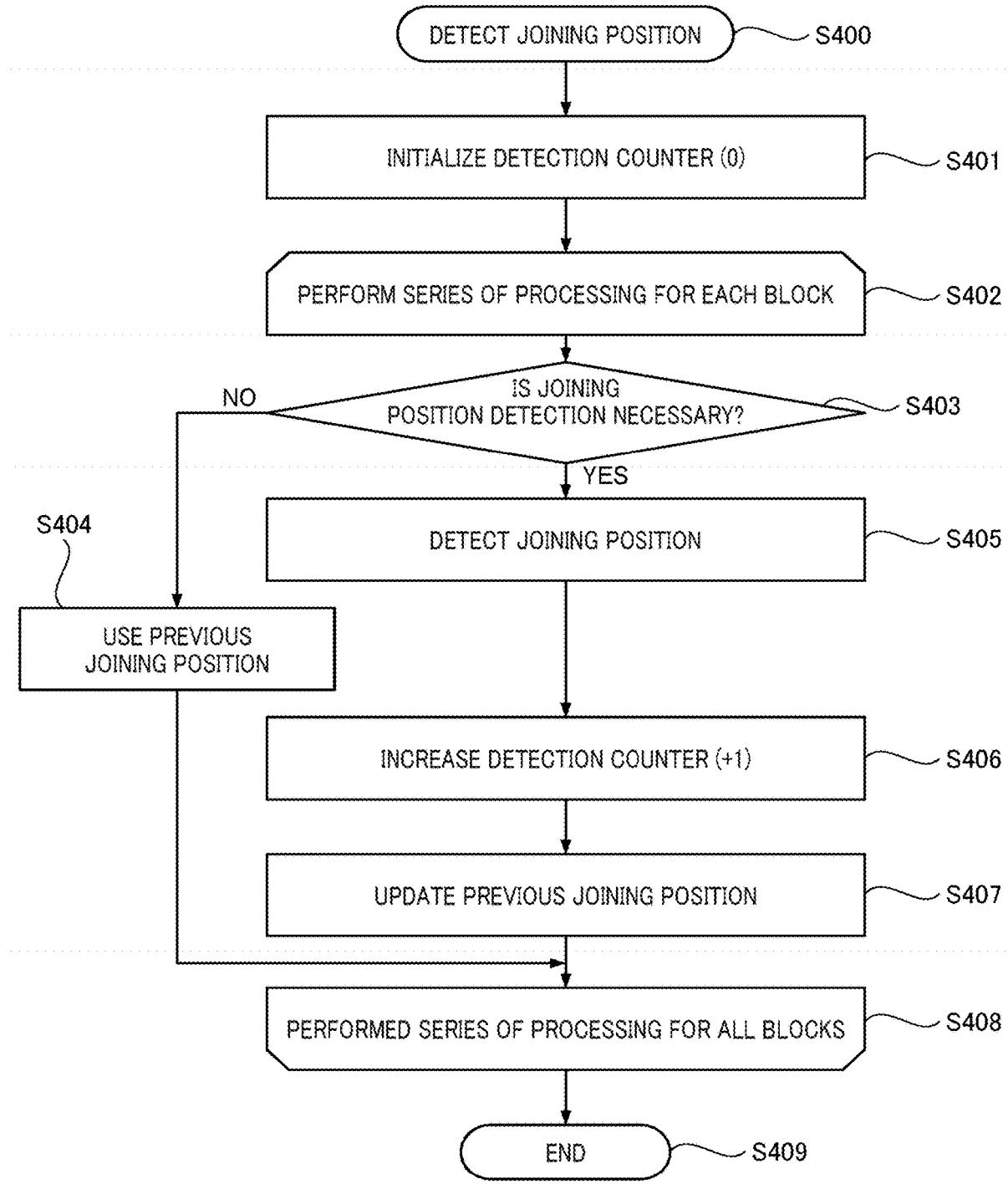
FIG. 22 is a flowchart of the joining-position detection processes performed by an omnidirectional imaging device, according to embodiments of the present disclosure.

FIG. 22 is a flowchart of the joining-position detection processes performed by the omnidirectional imaging device 10, according to the present embodiment.

The processes that are depicted in FIG. 22 are invoked by the processes in the steps S202 as depicted in FIG. 19, and the process starts from a step S400. Note also that the detection unit 208 of the omnidirectional imaging device 10 is in charge of the joining-position detection processes as illustrated in FIG. 22.

In a step S401, the omnidirectional imaging device 10 initializes the detection counter. In the present embodiment, the detection counter is used to count the number of blocks from which a joining position has been detected for the relevant frame, and in the step S401, the value of the detection counter is initialized to 0.

The loop of processes in the steps S402 to S408 is performed for each block (i). In a step S403, the omnidirectional imaging device 10 refers to the result of evaluation of the relevant block (i) in the table as illustrated in FIG. 21B, and determines whether or not the joining position detection is necessary.

When it is determined in the step S403 that the joining position detection is unnecessary (NO), the process is branched into a step S404. In a step S404, it is determined that the omnidirectional imaging device 10 uses the previous joining position for the relevant block (i), and the detection of joining position by the detection unit 208 is omitted, and the process proceeds to a step S408.

On the other hand, when it is determined in the step S403 that the joining position detection is necessary (YES), the process is branched into a step S405. In a step S405, the omnidirectional imaging device 10 detects the joining position in the relevant block, using, for example, the pattern matching method. In a step S406, the omnidirectional imaging device 10 increases the count of the detection counter. In a step S407, the omnidirectional imaging device 10 updates, on the table of the joining-position data storage unit 210 as illustrated in FIG. 21A, the value of the previous joining position in the relevant block with the detected joining position by overwriting an existing one. Then, the process proceeds to the step S408.

Once the processes in the steps S402 to S408 are completed for all the blocks, in the step S409, the joining-position detection process in the present embodiment is terminated, and the controlling process returns to the main route of processing as illustrated in FIG. 19.

In a step S203 as depicted in FIG. 19, the omnidirectional imaging device 10 determines whether the joining position has been updated. When the number of the detection counters as described above is more than one in the present frame that is to be processed, it is determined that joining position has been updated at least once. When it is determined in the step S203 that the joining position has been updated (YES), the process is branched into a step S204.

In a step S204, the omnidirectional imaging device 10 generate and update conversion table based on the joining-position data that includes at least one newly detected joining position. As a result, the process proceeds to a step S205. The processes in the step S204 correspond to the processes in the steps S105 and S106 as illustrated in FIG. 6. On the other hand, when it is determined in the step S203 that the joining position has not been updated (NO), the process directly proceeds to the step S205.

In a step S205, the omnidirectional imaging device 10 performs distortion correction on the partial-view image 0 and partial-view image 1 to generating a composite image, based on the current conversion table, and the process proceeds to a step S206. The processes in the step S205 correspond to the processes in the steps S107 to S109 as illustrated in FIG. 6.

In a step S206, the omnidirectional imaging device 10 determines whether or not the received frame is the last frame. When it is determined in the step S206 that the frame is not the last frame (NO), the process continues and returns to the step S201. By contrast, when it is determined in the step S206 that the frame is the last frame (YES), the process is branched into a step S207, and the composite-image generating process in the present embodiment is terminated.

Figure 23:
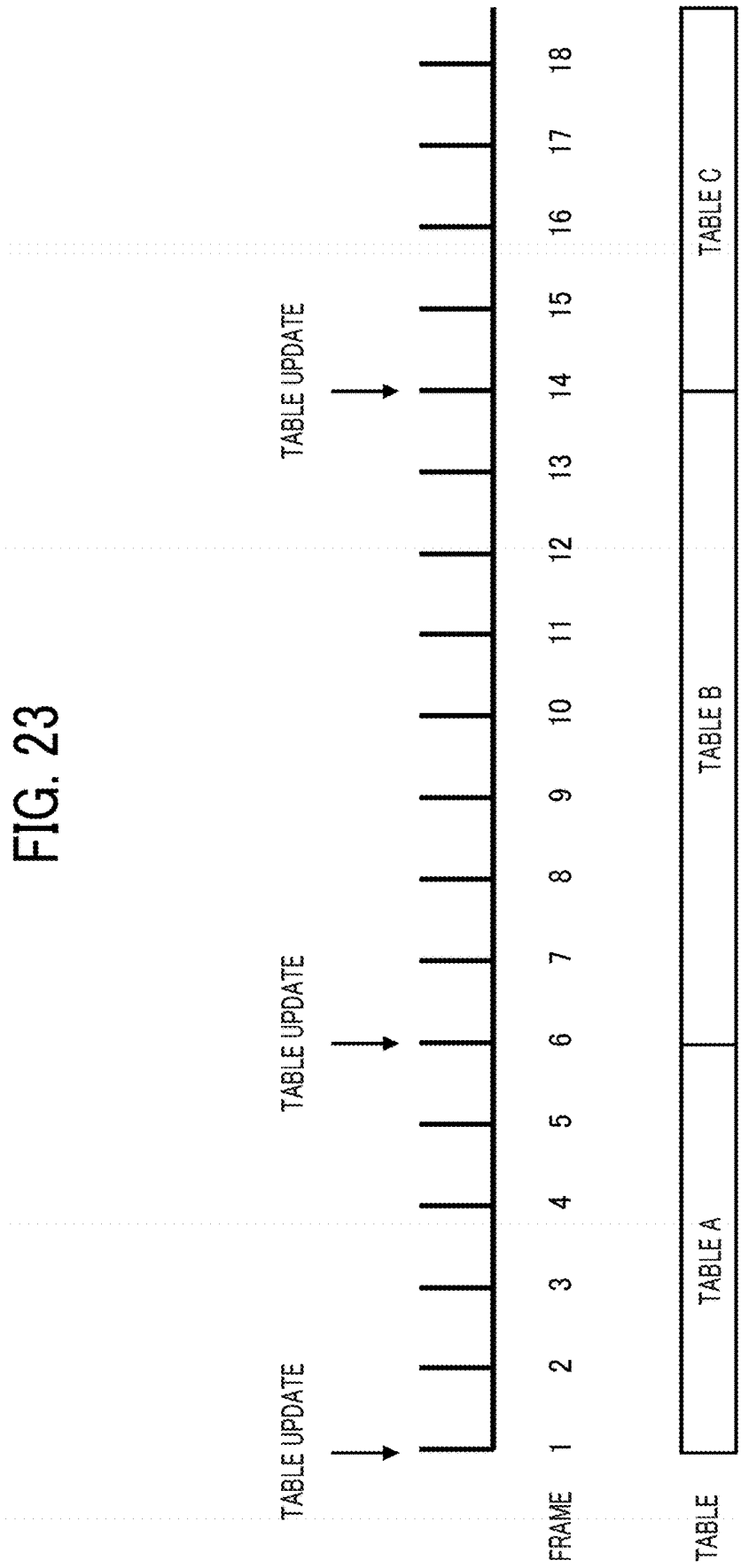
FIG. 23 is a timing chart of table update in an omnidirectional imaging device, according to embodiments of the present disclosure.

FIG. 23 is a timing chart of table update in the omnidirectional imaging device 10, according to the present embodiment.

As illustrated in FIG. 23, the joining position detection is performed for all the blocks in the top frame, i.e., frame 1, and the conversion table is updated. Then, when it is determined that the joining position update is necessary, the conversion table is updated as in frames 6 and 14. By contrast, when it is determined that the joining position update is unnecessary as in frames 2 to 5, frames 7 to 13, and frames 15 to 18, the table is not updated, and the conversion table that was used in the previous frame is used.

According to the above configurations, when the joining positions detected in the past for each one of the multiple portions indicates a sufficiently high degree of precision and thus is valid in the current frame, a joining position is not newly detected, and the joining positions that are detected in the past can be adopted. Accordingly, unnecessary update of joining position can be avoided when the matching score does not significantly improve and just another optimal joining position is detected even if a joining position is newly detected. Moreover, the discontinuity between a pair of frames can be prevented from appearing.

As the detection of joining position is omitted where unnecessary, the load of calculation or computation on the joining position detection can be reduced. As the load of calculation or computation is reduced, the hardware requirements for devices such as a central processing unit (CPU), a graphics processing unit (GPU), and a memory can be minimized, and the production cost can be reduced. Moreover, the amount of heat liberation can be reduced, and the power consumption can also be reduced. The omnidirectional imaging device 10 according to the present embodiment can effectively be used when, in particular, real-time streaming or real-time video recording is performed.

According to the embodiments of the present disclosure as described above, only the previous joining position is used for the intermittent joining. On the other hand, when the device according to the above embodiments of the present disclosure is used for video conference or video call, in most cases, the situation is within doors and the equipped space is partitioned. Accordingly, as known in the art, the distance to an object is limited to the position of, for example, the wall of the equipped space such as a conference room. A modification of the above embodiments of the present disclosure in which the furthest joining position detected within a predetermined period of time is stored in addition to the previous joining position is described below with reference to FIG. 19, FIG. 24, FIG. 25, and FIG. 26. Note also that such a furthest joining position may be referred to as a basic joining position in the following description. According to the present modification of the above embodiments of the present disclosure, even if the previous joining position is invalid, the basic joining position is used as long as the basic joining position is valid. Due to such a configuration, the detection of joining position can be omitted In the present modification of the above embodiments of the present disclosure, the functional blocks or the omnidirectional image and video generating processes are not significantly changed from the above embodiments of the present disclosure, and thus the functional blocks as illustrated in FIG. 5 and the flowchart as illustrated in FIG. 19 are referred to just as they are. For example, the processes according to the present modification of the above embodiments of the present disclosure start from a step S200 in response to the commands for starting the distribution sent from the video-conference assistance application.

In a step S201, the evaluation unit 207 of the omnidirectional imaging device 10 evaluates one of or both the previous joining position and the basic joining position stored in the joining-position data storage unit 210.

Figure 24:
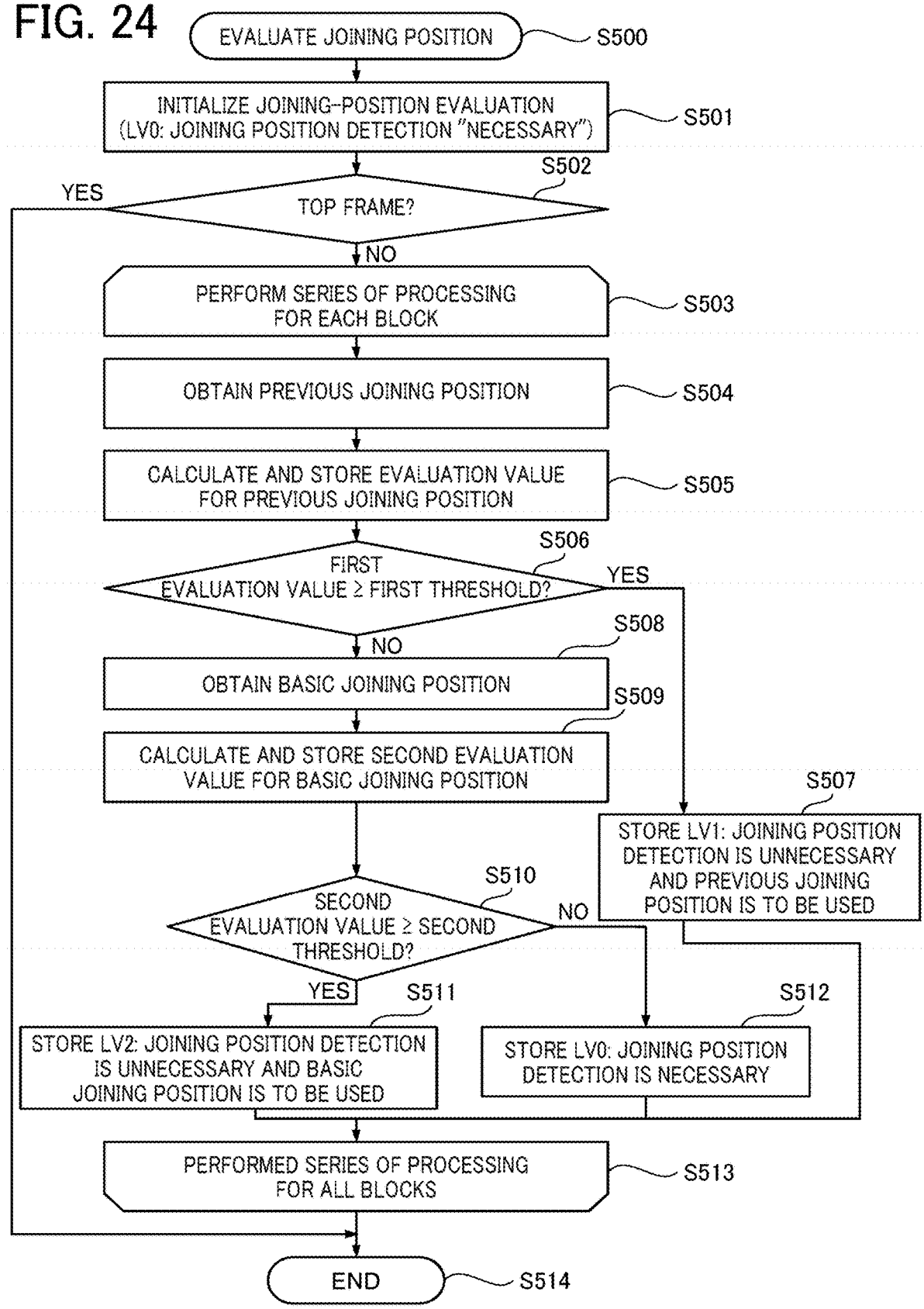
FIG. 24 is a flowchart of the joining-position evaluation processes performed by an omnidirectional imaging device, according to a modification of the above embodiments of the present disclosure.

FIG. 24 is a flowchart of the joining-position evaluation processes performed by the omnidirectional imaging device 10, according to a modification of the above embodiments of the present disclosure.

The processes that are depicted in FIG. 24 are invoked by the processes in the steps S201 as depicted in FIG. 19, and start from a step S500. In as similar manner to the above, the evaluation unit 207 of the omnidirectional imaging device 10 as illustrated in FIG. 5 is in charge of the joining-position evaluation processes as illustrated in FIG. 24.

In a step S501, the omnidirectional imaging device 10 initializes the joining-position evaluation. When the joining-position evaluation is to be initialized, it is determined in the joining-position evaluation processes that a joining position is to be detected for all the sites (LV0: joining position detection is necessary).

In a step S502, the omnidirectional imaging device 10 makes the process branched into two paths depending on whether the current frame is the top frame. When it is determined in the step S502 that the current frame is the top frame (YES), the value of the joining-position evaluation remains unchanged from the initial value, and in a step S514, the joining-position evaluation process in the present embodiment is terminated.

On the other hand, when it is determined in the step S502 that the current frame is not the top frame (NO), the process proceeds to a step S503. The loop of processes in the steps S503 to S513 is performed for each block (i).

In a step S504, the omnidirectional imaging device 10 obtains the previous joining position from the joining-position data storage unit 210. In a step S505, the omnidirectional imaging device 10 calculates the first evaluation value (e.g., matching score) of the current frame with reference to the previous joining position, and stores the calculated and obtained first evaluation value in the joining-position data storage unit 210. In a step S506, the omnidirectional imaging device 10 determines whether or not the first evaluation value is equal to or greater than the first threshold.

When it is determined in the Step S506 that the first evaluation value is equal to or greater than the first threshold (YES), the process branches into a step S507. In a step S507, the omnidirectional imaging device 10 stores a result of evaluation that the joining position detection is unnecessary and the previous joining position is used (LV1: joining position detection is unnecessary and the previous joining position is used).

On the other hand, when it is determined in the step S506 that the first evaluation value is less than the first threshold (NO), the process branches into a step S508. In a step S508, the omnidirectional imaging device 10 obtains a basic joining position from the joining-position data storage unit 210. In the second frame and the following frames, the basic joining position that is firstly stored in the memory is the joining position that is detected for the first time. Although the update processes of the basic joining position will be described later in detail, the furthest joining positions of the frames since the recording has started until the present time or the furthest joining positions of at least several continuous frames until the present time are maintained.

In a step S509, the omnidirectional imaging device 10 calculates the second evaluation value (e.g., matching score) in the current frame with reference to the basic joining position, and stores the obtained second evaluation value in the joining-position data storage unit 210. In the present embodiment, when it is determined that the first evaluation value is smaller than the first threshold, the device according to the present modification of the above embodiments of the present disclosure is configured to calculate the second evaluation value with reference to the basic joining position. Due to such a configuration, the load of computation of evaluation value can be reduced as much as possible. In a step S510, the omnidirectional imaging device 10 determines whether or not the second evaluation value is equal to or greater than the second threshold.

When it is determined in the Step S510 that the second evaluation value is equal to or greater than the second threshold (YES), the process branches into a step S511. In a step S511, the omnidirectional imaging device 10 stores a result of evaluation that the joining position detection is unnecessary and the basic joining position is used (LV2: joining position detection is unnecessary and the basic joining position is used).

On the other hand, when it is determined in the Step S510 that the second evaluation value is less than the second threshold (NO), the process branches into a step S512. In a step S512, the omnidirectional imaging device 10 stores a result of evaluation that the joining position detection is necessary (LV0: joining position detection is necessary).

Once the processes in the steps S503 to S513 are completed for all the blocks, in the step S514, the joining-position evaluation process in the present embodiment is terminated, and the controlling process returns to the main route of processing as illustrated in FIG. 19.

FIG. 25A and FIG. 25B are diagrams each illustrating an example data structure of the joining-position data stored in the joining-position data storage unit 210, according to a modification of the above embodiments of the present disclosure.

FIG. 25A is a diagram illustrating a table in which the past joining positions to be evaluated are recorded, according to the present embodiment.

FIG. 25B is a diagram illustrating a table in which the results of evaluation obtained in the joining-position evaluation processes as depicted in FIG. 24 are recorded, according to the present embodiment.

As illustrated in FIG. 25A, the coordinate values of the basic joining position is stored in the joining-position storage table on a block-by-block basis in addition to the coordinate values of the previous joining position. As illustrated in FIG. 25B, in the joining-position evaluation processes as depicted in FIG. 24, the first evaluation value that indicates the validity of the previous joining position, the second evaluation value that indicates the validity of the basic joining position, and the results of evaluation based on the first evaluation value and the second evaluation value are recorded for a target frame on a block-by-block basis.

As illustrated in FIG. 19, in the step S202, the detection unit 208 of the omnidirectional imaging device 10 refers to the table that indicates the result of evaluation as illustrated in FIG. 25B, and detects a joining position on a site where necessary based on the data in the table.

Figure 26:
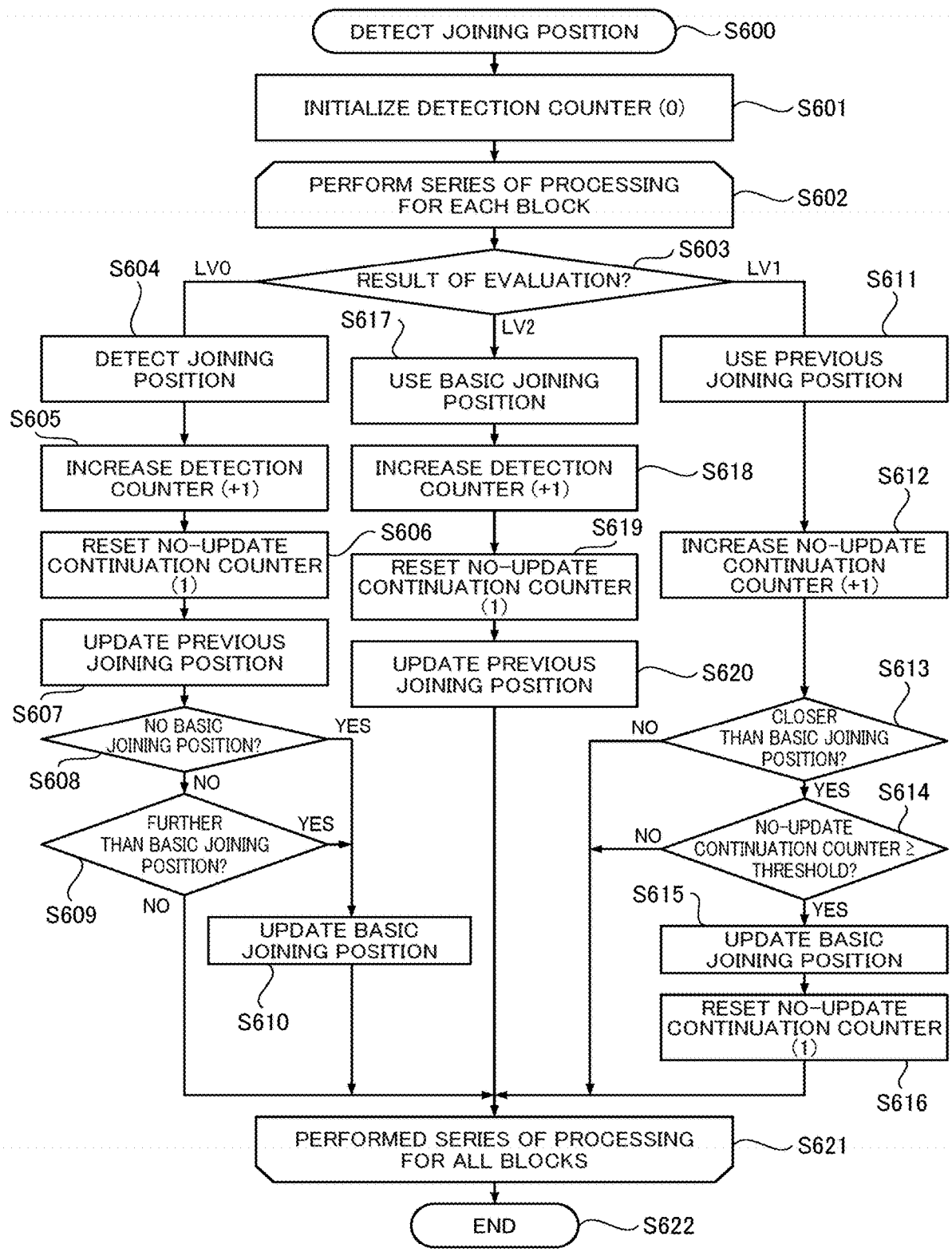
FIG. 26 is a flowchart of the joining-position detection processes performed by an omnidirectional imaging device, according to a modification of the above embodiments of the present disclosure.

FIG. 26 is a flowchart of the joining-position detection processes performed by the omnidirectional imaging device 10, according to a modification of the above embodiments of the present disclosure.

The processes that are depicted in FIG. 26 are invoked by the processes in the steps S202 as depicted in FIG. 19, and start from a step S600. Note also that the detection unit 208 of the omnidirectional imaging device 10 as illustrated in FIG. 5 is in charge of the joining-position detection processes as illustrated in FIG. 26.

In a step S601, the omnidirectional imaging device 10 initializes the detection counter. The loop of processes in the steps S602 to S621 is performed for each block (i). In a step S603, the omnidirectional imaging device 10 refers to the result of evaluation of the relevant block (i) in the table as illustrated in FIG. 25B, and the process is branched into three paths depending on the result of evaluation.

When it is determined in the step S603 that the joining position detection is necessary (LV0), the process is branched into a step S604. In a step S604, the omnidirectional imaging device 10 detects the joining position in the relevant block, using, for example, the pattern matching method. In a step S605, the omnidirectional imaging device 10 increases the count of the detection counter. In a step S606, the omnidirectional imaging device 10 resets the no-update continuation counter for the relevant block. In other words, the omnidirectional imaging device 10 sets the no-update continuation counter for the relevant block to 1. In the present modification of the above embodiments of the present disclosure, the no-update continuation counter is used to count, for the relevant block, the number of continuous frames in which no joining position is to be updated. In a step S607, the omnidirectional imaging device 10 updates, on the table of the joining-position data storage unit 210 as illustrated in FIG. 25A, the value of the previous joining position in the relevant block with the detected joining position.

In a step S608, the omnidirectional imaging device 10 determines whether the basic joining position has already been stored. As the basic joining position is not-yet stored for the top frame, it is determined in the present step that no basic joining position exists. When it is determined in the step S608 that no basic joining position exists (YES), the process branches into a step S610, and the value of the basic joining position in the relevant block is updated with the detected joining position on the table of the joining-position data storage unit 210 as illustrated in FIG. 25A. Then, the process proceeds to a step S621.

On the other hand, when it is determined in the step S608 that a basic joining position has already been stored (NO), the process branches into a step S609. In a step S609, the omnidirectional imaging device 10 determines whether or not the newly detected joining position is at a position further than the basic joining position. When it is determined in the step S608 that the newly detected joining position is at a position further than the basic joining position (YES), the process branches into a step S610, and the value of the basic joining position in the relevant block is updated with the detected joining position on the table of the joining-position data storage unit 210 as illustrated in FIG. 25A. Then, the process proceeds to a step S621. On the other hand, when it is determined in the step S608 that the newly detected joining position is not at a position further than the basic joining position (NO), the process proceeds to the step S621 with no change.

Note that the determination as to whether a detected joining position is at a position further than a reference joining position is described as above with reference to FIG. 11.

FIG. 27 is a diagram illustrating how the joining position varies depending on the distance to an object, according to the present embodiment.

FIG. 27 illustrates a distance A and a distance B, and ach of the distances A and B indicate the distance to an object with reference to the center of the optical system of the omnidirectional imaging device 10. As illustrated in FIG. 27, the joining position shifts according to the distance to an object even if the objects are placed in the same direction with reference to a joining boundary. The distance A indicates a joining position at a long distance as illustrated in FIG. 11, and the distance B indicates a joining position at a short distance as illustrated in FIG. 11. As the distance to the object increases, the object moves from the periphery to the center on the partial-view image.

On the other hand, when it is determined in the step S603 that the joining position detection is unnecessary and the previous joining position is used (LV1), the process is branched into a step S611. In a step S611, it is determined that the omnidirectional imaging device 10 uses the previous joining position for the relevant block (i), and the detection of joining position by the detection unit 208 is omitted. As a result, the process proceeds to a step S612. As the previous joining position is used once again, in a step S612, the omnidirectional imaging device 10 increases the no-update continuation counter for the relevant block.

In a step S613, the omnidirectional imaging device 10 determines whether or not the previous joining position is at a closer distance than the basic joining position. When it is determined in the step S613 that the previously detected joining position is not closer than the basic joining position (NO), the process proceeds to the step S621 with no change. On the other hand, when it is determined in the step S613 that the previously detected joining position is closer than the basic joining position (YES), the process branches into a step S614.

In a step S614, the omnidirectional imaging device 10 determines whether or not the value of the no-update continuation counter in the relevant block exceeds a predetermined threshold. When it is determined in the step S614 that the value of the no-update continuation counter does not exceed a predetermined threshold (NO), the process proceeds to the step S621 with no change.

On the other hand, when it is determined in the step S614 that the value of the no-update continuation counter is equal to or greater than a predetermined threshold (YES), the process proceeds to a step S615, and the value of the basic joining position in the relevant block is updated with the previous joining position on the table of the joining-position data storage unit 210 as illustrated in FIG. 25A. Subsequently, in a step S616, the no-update continuation counter for the relevant block is reset, and the process proceeds to the step S621.

Referring to the step S603 again, when it is determined in the step S603 that the joining position detection is unnecessary and the basic joining position is used (LV2), the process is branched into a step S617. In a step S617, the omnidirectional imaging device 10 uses the basic joining position for the relevant block, and the detection of joining position by the detection unit 208 is omitted. As a result, the process proceeds to a step S618. In a step S618, the omnidirectional imaging device 10 increases the count of the detection counter. Although the basic joining position is used without newly detecting a joining position, the count of the detection counter is increased because the basic joining position is different from the previous joining position.

In a step S619, the omnidirectional imaging device 10 resets the no-update continuation counter for the relevant block. In other words, the omnidirectional imaging device 10 sets the no-update continuation counter for the relevant block to 1. In a step S620, the omnidirectional imaging device 10 updates, on the table of the joining-position data storage unit 210 as illustrated in FIG. 25A, the value of the previous joining position in the relevant block with the basic joining position. In such cases, the basic joining position matches the previous joining position.

Such a basic joining position is again compared with the basic joining position stored in the memory to detect another joining position at a long distance or to detect another joining position at a short distance. When the period of duration at the joining position same as the previous joining position satisfies prescribed criteria, i.e., when it is determined that the value of the no-update continuation counter is equal to or greater than a predetermined threshold, the basic joining position is updated with that joining position.

Once the processes in the steps S602 to S621 are completed for all the blocks, in the step S622, the joining-position detection process in the present embodiment is terminated, and the controlling process returns to the main route of processing as illustrated in FIG. 19.

In a step S203 as depicted in FIG. 19, the omnidirectional imaging device 10 determines whether the joining position has been updated. When it is determined in the step S203 that the joining position has been updated (YES), the process is branched into a step S204. In a step S204, the omnidirectional imaging device 10 generate and update the conversion table, and the process proceeds to a step S205. On the other hand, when it is determined in the step S203 that the joining position has not been updated (NO), the process directly proceeds to the step S205. In a step S205, the omnidirectional imaging device 10 performs distortion correction on the partial-view image 0 and partial-view image 1 to generating a composite image, based on the current conversion table, and the process proceeds to a step S206. The processes in the step S205 correspond to the processes in the steps S107 to S109 as illustrated in FIG. 6.

In the step S206, the omnidirectional imaging device 10 determines whether the received frame is the last frame. When it is determined in the step S206 that the frame is not the last frame (NO), the process continues and returns to the step S201. By contrast, when it is determined in the step S206 that the frame is the last frame (YES), the process is branched into a step S207, and the composite-image generating process in the present embodiment is terminated.

According to the above configurations, when the basic or previous joining position indicates a sufficiently high degree of precision and thus is valid in the current frame for each one of the multiple portions, a joining position is not newly detected, and any desired one of the previous joining position and the basic joining position can be adopted. Accordingly, the discontinuity between a pair of frames can be prevented from appearing. As the detection of joining position is omitted where unnecessary, the load of computation on the joining position detection can be reduced. As the load of calculation or computation is reduced, the hardware requirements for devices can also be lightened, and the amount of heat liberation can be reduced and the power consumption can also be reduced.

In the present embodiment, the furthest joining position in the certain length of time is to be stored as the basic joining position. As long distances such as the distance at infinity does not have to be taken into consideration in an in-room situation, in particular, a conference room where the space is partitioned and limited, and the distance that has to be taken into consideration can be limited. When a joining position is detected at a longer distance than the position recorded in a basic joining position, a situation in which an object such as a white board is moved and an object such as a wall at a long distance that is hidden by an article appears is assumed. In such cases, it is determined that the joining position at a long distance is updated, and the basic joining position is updated. On the contrary, there are some cases in which an object at a short distance is moved and an object at a long distance that was so far visible may suddenly be hidden by the object at a short distance. In order to deal with such a situation, the above no-update continuation counter is used. When no update is performed for a certain length of time, it is determined that the joining position at a long distance is changed, and the basic joining position is updated to a position at a shorter distance than before. The joining position at a long distance rarely moves in usage where, for example, a video conference is to be assisted and the omnidirectional imaging device 10 is statically installed. However, regarding the joining position at a short distance, there is a possibility that a joining position at a short distance is detected on a temporary basis due to an event in which, for example, a person passes by. In order to handle such a situation, the no-update continuation counter is configured not to update the basic joining position unless an object is fixed for a certain length of time. The configuration or structure according to the present modification of the above embodiments of the present disclosure is particularly useful in indoor usage where a video conference is to be assisted and the omnidirectional imaging device 10 is statically installed in the space that is partitioned by a shielding object such as a wall.

In the step S604 of FIG. 26, a joining position on a site where the degree of validity does not satisfy prescribed criteria is detected using, for example, the pattern matching method. In so doing, a prescribed search area is set. As the search area is limited as the above basic joining position is used, the load of computation can further be reduced.

Figure 28A:
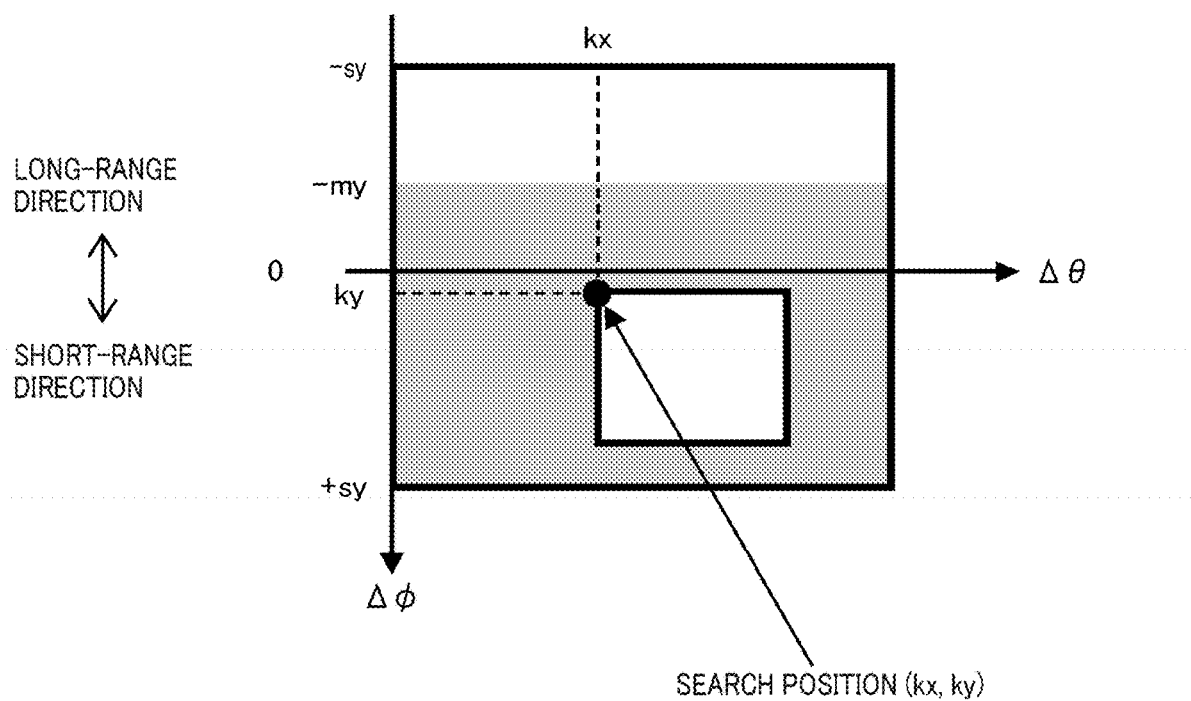
FIG. 28A is a diagram illustrating a technology to limit a search area based on a basic joining position when a joining position is to be detected, according to a specific embodiment of the present disclosure.

FIG. 28A is a diagram illustrating a technology to limit the search area based on the basic joining position when a joining position is to be detected, according to a specific embodiment of the present disclosure.

As described above, the joining position detection takes a long time for the processing when the search area is set to the entire range (−sy to +sy). As described above, the basic joining position indicates the end position of the conference room 300 at a long distance. Accordingly, the search area may be limited toward the short-range direction with reference to the basic joining position (−my to +sy) such that the joining position can be detected at high speed. In the present specific embodiment, −my may be regarded as a basic joining position. Alternatively, a certain margin is added to the basic joining position, and −my may be regarded as a joining position at a long distance. Note also that the search area at a long distance is not limited in the top frame, and the joining position is detected throughout the entire range (−sy to +sy).

Figure 28B:
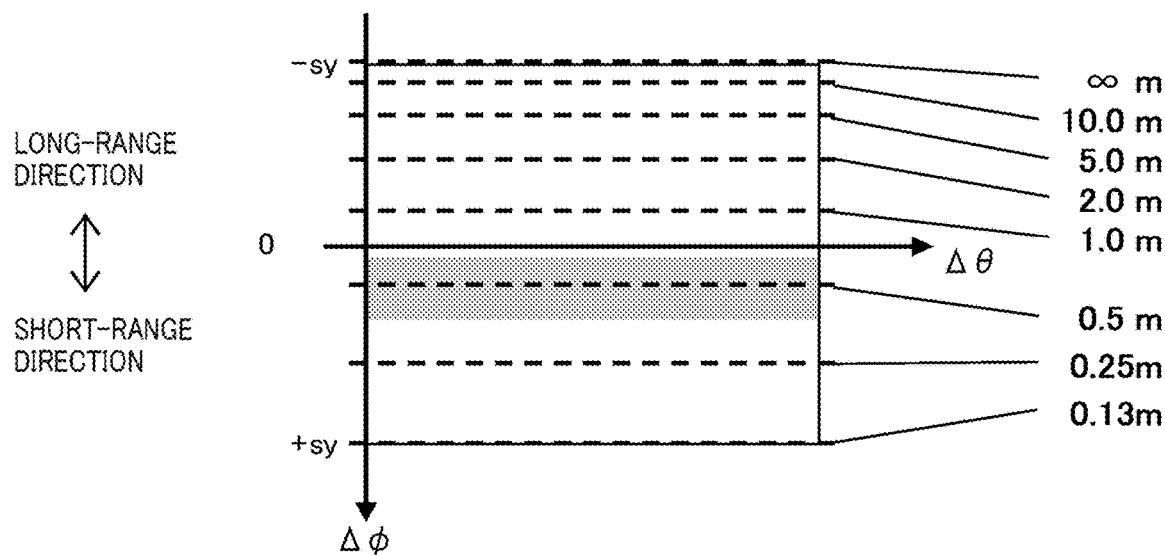
FIG. 28B is a diagram illustrating a technology to limit a search area based on distance-to-object information when a joining position is to be detected, according to a specific embodiment of the present disclosure.

FIG. 28B is a diagram illustrating a technology to limit the search area based on the distance-to-object information, which is separately detected, in place of the basic joining position as described above, when a joining position is to be detected, according to a specific embodiment of the present disclosure.

As illustrated in FIG. 28B, a search position that correspond to the distance to an object is set in advance, and the search area that is set in advance is retrieved from the distance-to-object information. As the search is performed within the retrieved search area, a joining position can be detected at high speed. For example, when the distance-to-object information is 0.5 meters (m) as illustrated in FIG. 28B, the joining position can be detected within the area around 0.5 m that is indicated by gray color. In the present specific embodiment, the distance-to-object information may be estimated from the size of the object on an image. Alternatively, for example, the result of distance measurement that is obtained by a range sensor as known in the art may be used to obtain the distance-to-object information.

According to the embodiments of the present disclosure as described above, an image processing device, an image processing system, an imaging device, an image processing method, and a recording medium storing program code can be provided in which the deterioration in the quality of the video data due to the changes in joining position can be prevented. For example, an image can be prevented from moving in an unnatural way around a joining position on a composite image obtained by combining a plurality of images.

In the embodiments as described above, the image processing device, the image processing system, and the imaging device are configured by the omnidirectional imaging device 10. However, the configuration of the image processing device, the image processing system, and the imaging device is not limited to the embodiments described above. In a further alternative embodiment, the image processing excluding the above partial-view image generating process may be implemented on the information terminal 170 or other image processing devices such as a personal computer, a server, and a virtual computer on the cloud network in a distributed manner. In such an alternative embodiment, the omnidirectional imaging device 10 acquires and outputs a plurality of partial-view images, and the information terminal 170 or other image processing devices receive the multiple partial-view images output from the omnidirectional imaging device 10. Due to such a configuration, composite-image generating processes in which the intermittent joining is performed can be performed, and output images can be generated. Moreover, monitor images can be displayed, or the image data can be stored.

In the embodiments of the present disclosure as described above, the omnidirectional imaging device 10 and the information terminal 170 are combined to configure and provide a video-conference assistance system. However, no limitation is indicated thereby, and the functionality of the information terminal 170 may be incorporated into the omnidirectional imaging device 10 to configure a single device that can perform both the recording of video data and the distribution of the video data to the server.

In the embodiments of the present disclosure as described above, a matching score is adopted as a concrete index used to evaluate the validity of the joining position. As a matching score can speedily be obtained at low cost, the adoption of a matching score is suitable for the implementation of a device whose hardware restriction is relatively tight. However, no limitation is indicated thereby, and a method of evaluating the validity of a joining position is not limited to a method in which the matching score is used to evaluate the validity of a joining position. For example, object recognition devices or the like that visually recognize an object such as a face on an image are known in the art. If an object that is captured at a certain position of the image changes, as known in the art, the joining positions on the image has to be changed accordingly. In order to handle such a situation, the results of recognition in the current frame may be used as an evaluation value to determine whether or not the detection of a joining position is necessary, with reference to the results of recognition at the joining positions in the previous frame in place of a matching score or threshold. For example, the system may be configured to determine that the detection of a joining position is necessary when a wall is recognized or nothing is recognized in the current frame at the site where a face is recognized in the previous frame.

The functional part as described above is realized by a computer-readable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), electrically programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device (PD) such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Embodiments of the present invention has been described above, but the present invention is not limited to those embodiments and various applications and modifications may be made without departing from the scope of the invention.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing device, comprising:
a receiver configured to receive a first image and a second image;
a memory configured to store a joining position at each one of a plurality of portions between the first image and the second image received by the receiver; and
circuitry configured to
evaluate, for each of the plurality of portions, validity of the joining position in a past stored in the memory; and
generate a composite image based on the first image and the second image received by the receiver and the joining position in the past stored in the memory on a site where the validity meets a criterion, wherein
the joining position stored in the memory includes, for each of the plurality of portions, a previous joining position and a furthest joining position detected within a prescribed period of time.

2. The image processing device according to claim 1, wherein
the joining position stored in the memory includes a previous joining position for each of the plurality of portions,
the validity indicates a relevance ratio when the previous joining position is applied to the first image and the second image, and
when the validity meets the criterion, the previous joining position is used as the joining position in the past for generating the composite image.

3. The image processing device according to claim 1, wherein
the circuitry is configured to use a relevance ratio when the previous joining position is applied to the first image and the second image as a first evaluation value indicating the validity, and use a relevance ratio when the furthest joining position is applied to the first image and the second image as a second evaluation value indicating the validity, and
the criterion includes a first criterion and a second criterion, and when the first evaluation value does not satisfy the first criterion and the second evaluation value satisfies the second criterion, the furthest joining position is used as the joining position in the past for generating the composite image.

4. The image processing device according to claim 1, wherein the circuitry is configured to update, for each of the plurality of portions, the furthest joining position stored in the memory with the joining position used for generating the composite image, when the joining position used for generating the composite image is at a longer distance than the furthest joining position stored in the memory.

5. The image processing device according to claim 1, wherein the circuitry is configured to update, for each of the plurality of portions, the furthest joining position stored in the memory with the joining position used for generating the composite image, when the joining position used for generating the composite image is at a shorter distance than the furthest joining position stored in the memory and a period of duration at the joining position approximately same as the joining position used for generating the composite image satisfies a prescribed criterion.

6. The image processing device according to claim 1, wherein the circuitry is configured to set a search area on a site where the validity does not meet the criterion based on the furthest joining position, and detect the joining position between the first image and the second image.

7. The image processing device according to claim 1, wherein
the circuitry is configured to obtain distance-to-object information, and
the circuitry is configured to set a search area on a site where the validity does not meet the criterion based on the distance-to-object information and detect the joining position between the first image and the second image.

8. The image processing device according to claim 1, wherein
the circuitry is configured to generate the composite image using a conversion table generated for each of the plurality of portions based on the joining position,
the circuitry is configured to update the conversion table when the joining position is changed at one or more portions of the plurality of portions and a number of the plurality of portions at which the joining position is changed is equal to or greater than a threshold, and
the circuitry is configured not to update the conversion table when the validity meets the criterion at the plurality of portions whose number is equal to or greater than the threshold.

9. The image processing device according to claim 1, wherein
each one of the first image, the second image, and the composite image makes up an image of one frame in video data, and
the composite image makes up a spherical image, a panoramic image of 360 degrees, or a part of the spherical image or the panoramic image of 360 degrees.

10. An image processing system, comprising
the image processing device according to claim 1; and
circuitry configured to distribute the composite image.

11. An imaging device, comprising:
a plurality of optical systems;
an imaging sensor configured to capture a plurality of partial-view images through each one of the plurality of optical systems; and
the image processing device according to claim 1, wherein
the first image and the second image are based on a first partial-view image and a second partial-view image each of which is captured through different one of the plurality of optical systems.

12. A method of processing an image, the method comprising:
 reading a past joining position at each one of a plurality of portions between a pair of images;
 receiving a first image and a second image;
 evaluating validity of the past joining position read in the reading for each of the plurality of portions; and
 generating a composite image based on the first image and the second image and the past joining position read for a site where the validity meets a criterion, wherein
 the joining position includes, for each of the plurality of portions, a previous joining position and a furthest joining position detected within a prescribed period of time.

13. A computer-readable non-transitory recording medium storing computer executable instructions which, when executed by a computer, cause the computer to execute a process comprising:
 receiving a first image and a second image;
 storing, in a memory, a joining position at each one of a plurality of portions between the first image and the second image;
 evaluating, for each of the plurality of portions, validity of the joining position in a past stored in the memory; and
 generating a composite image based on the first image and the second image and the joining position in the past stored in the memory on a site where the validity meets a criterion, wherein
 the joining position stored in the memory includes, for each of the plurality of portions, a previous joining position and a furthest joining position detected within a prescribed period of time.

* * * * *